United States Patent
Amir et al.

(10) Patent No.: US 10,698,867 B2
(45) Date of Patent: *Jun. 30, 2020

(54) FILE INDEX, METADATA STORAGE, AND FILE SYSTEM MANAGEMENT FOR MAGNETIC TAPE

(71) Applicant: International Business Machines Corporation, Armonk, NY (US)

(72) Inventors: Arnon Amir, Saratoga, CA (US); David A. Pease, San Jose, CA (US); Rainer Richter, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 785 days.

This patent is subject to a terminal disclaimer.

(21) Appl. No.: 15/232,597

(22) Filed: Aug. 9, 2016

(65) Prior Publication Data

US 2016/0350016 A1 Dec. 1, 2016

Related U.S. Application Data

(63) Continuation of application No. 12/732,158, filed on Mar. 25, 2010, now Pat. No. 9,430,155.

(51) Int. Cl.
*G06F 3/06* (2006.01)
*G11B 27/032* (2006.01)
(Continued)

(52) U.S. Cl.
CPC .......... *G06F 16/1873* (2019.01); *G06F 3/065* (2013.01); *G06F 3/067* (2013.01);
(Continued)

(58) Field of Classification Search
None
See application file for complete search history.

(56) References Cited

U.S. PATENT DOCUMENTS

| 5,369,523 A | 11/1994 | Millar et al. |
| 5,369,532 A | 11/1994 | Dodt et al. |

(Continued)

FOREIGN PATENT DOCUMENTS

| JP | H08190779 A | 7/1996 |
| JP | 2011113605 A | 6/2011 |

(Continued)

OTHER PUBLICATIONS

Amir et al., U.S. Appl. No. 15/232,683, filed Aug. 9, 2016.
(Continued)

*Primary Examiner* — James Trujillo
*Assistant Examiner* — Cheryl M Shechtman
(74) *Attorney, Agent, or Firm* — Zilka-Kotab, P.C.

(57) ABSTRACT

In one embodiment, a data storage system includes a tape drive configured to: write a plurality of files to a first partition of a magnetic recording tape; and write an index to a second partition of the magnetic recording tape, the index including information about locations of data of the plurality of files in the first partition of the magnetic recording tape. In another embodiment, a magnetic recording tape includes: a plurality of files to written to a first partition of the magnetic recording tape using a tape drive; and an index written to a second partition of the magnetic recording tape using the tape drive, the index including information about locations of data of the plurality of files in the first partition of the magnetic recording tape.

20 Claims, 14 Drawing Sheets

(51) Int. Cl.
G06F 16/17 (2019.01)
G06F 16/18 (2019.01)
(52) U.S. Cl.
CPC .......... *G06F 3/0611* (2013.01); *G06F 3/0643* (2013.01); *G06F 3/0656* (2013.01); *G06F 3/0679* (2013.01); *G06F 3/0682* (2013.01); *G06F 3/0686* (2013.01); *G06F 16/1727* (2019.01); *G11B 27/032* (2013.01)

(56) References Cited

U.S. PATENT DOCUMENTS

| | | | |
|---|---|---|---|
| 5,394,280 A * | 2/1995 | Chliwnyj | G11B 5/00817 360/48 |
| 5,710,676 A | 1/1998 | Fry et al. | |
| 6,049,848 A | 4/2000 | Yates et al. | |
| 6,493,166 B1 | 12/2002 | Takayama | |
| 6,546,384 B2 | 4/2003 | Shaath et al. | |
| 6,718,436 B2 | 4/2004 | Kim et al. | |
| 6,766,520 B1 | 7/2004 | Rieschl et al. | |
| 6,779,080 B2 | 8/2004 | Basham et al. | |
| 6,937,411 B2 | 8/2005 | Goodman et al. | |
| 7,020,656 B1 | 3/2006 | Gong | |
| 7,047,250 B1 | 5/2006 | Agarwal et al. | |
| 7,103,811 B2 | 9/2006 | Talagala et al. | |
| 7,277,246 B2 | 10/2007 | Barbian et al. | |
| 7,430,647 B2 | 9/2008 | Sandorti et al. | |
| 7,454,406 B2 | 11/2008 | Kaplan et al. | |
| 7,469,241 B2 | 12/2008 | Bellamkonda et al. | |
| 8,099,758 B2 | 1/2012 | Schaefer et al. | |
| 8,176,009 B2 | 5/2012 | Meller et al. | |
| 8,386,733 B1 | 2/2013 | Tsaur et al. | |
| 8,477,440 B2 | 7/2013 | Itagaki et al. | |
| 9,063,666 B2 | 6/2015 | Amir et al. | |
| 9,430,155 B2 | 8/2016 | Amir et al. | |
| 2004/0130818 A1* | 7/2004 | Chliwnyj | G11B 5/584 360/72.1 |
| 2005/0125602 A1 | 6/2005 | Ehrlich | |
| 2005/0190660 A1 | 9/2005 | Wakelin et al. | |
| 2006/0106891 A1 | 5/2006 | Mahar et al. | |
| 2007/0021140 A1 | 1/2007 | Keyes et al. | |
| 2007/0088754 A1 | 4/2007 | Brannon et al. | |
| 2007/0220029 A1 | 9/2007 | Jones et al. | |
| 2007/0239655 A1 | 10/2007 | Agetsuma et al. | |
| 2007/0274165 A1 | 11/2007 | Tanaka et al. | |
| 2008/0046670 A1 | 2/2008 | Lam | |
| 2008/0100945 A1 | 5/2008 | Boyton et al. | |
| 2010/0265612 A1 | 10/2010 | Jaquette | |
| 2010/0280651 A1 | 11/2010 | Edling et al. | |
| 2011/0122522 A1 | 5/2011 | Itagaki et al. | |
| 2011/0238716 A1 | 9/2011 | Amir et al. | |
| 2011/0238905 A1 | 9/2011 | Amir et al. | |
| 2011/0238906 A1 | 9/2011 | Amir et al. | |
| 2014/0108720 A1 | 4/2014 | Abe et al. | |
| 2015/0127980 A1* | 5/2015 | Klein | G06F 16/113 714/15 |
| 2016/0350017 A1 | 12/2016 | Amir et al. | |

FOREIGN PATENT DOCUMENTS

| | | | |
|---|---|---|---|
| WO | 9745837 | A1 | 12/1997 |
| WO | 2008073716 | A1 | 6/2008 |

OTHER PUBLICATIONS

Amir et al., U.S. Appl. No. 12/732,159, filed Mar. 25, 2010.
Non-Final Office Action from U.S. Appl. No. 12/732,159, dated Mar. 28, 2012.
Final Office Action from U.S. Appl. No. 12/732,159, dated Nov. 6, 2012.
Examiner's Answers to Appeal Brief from U.S. Appl. No. 12/732,159, dated Dec. 18, 2013.
Non-Final Office Action from U.S. Appl. No. 12/732,159, dated Jun. 5, 2014.
Notice of Allowance from U.S. Appl. No. 12/732,159, dated Oct. 29, 2014.
Supplemental Notice of Allowability from U.S. Appl. No. 12/732,159, dated Feb. 13, 2015.
Amir et al., U.S. Appl. No. 12/732,158, filed Mar. 25, 2010.
Election/Restriction Requirement from U.S. Appl. No. 12/732,158, dated Mar. 1, 2012.
Non-Final Office Action from U.S. Appl. No. 12/732,158, dated Jul. 2, 2012.
Final Office Action from U.S. Appl. No. 12/732,158, dated Feb. 11, 2013.
Non-Final Office Action from U.S. Appl. No. 12/732,158, dated Dec. 3, 2013.
Final Office Action from U.S. Appl. No. 12/732,158, dated Jul. 18, 2014.
Amir et al., U.S. Appl. No. 12/732,151, filed Mar. 25, 2010.
Non-Final Office Action Summary from U.S. Appl. No. 12/732,151, dated Mar. 29, 2012.
Final Office Action from U.S. Appl. No. 12/732,151, dated Nov. 8, 2012.
Non-Final Office Action from U.S. Appl. No. 12/732,151, dated Jan. 17, 2014.
Final Office Action from U.S. Appl. No. 12/732,151, dated Jul. 31, 2014.
Abe et al., U.S. Appl. No. 13/651,207, filed Oct. 12, 2012.
Wikipedia, "Encryption," Wikipedia, http://en.wikipedia.org/wiki/Encryption, version as of Mar. 1, 2009, pp. 1-2.
Huang et al., "Data Grid for Large-Scale Medical Image Archive and Analysis," MM '05, Nov. 6-11, 2005, pp. 1005-1013.
Jaquette, G.A., "LTO: A better format for mid-range tape," IBM Journal of Research and Development, vol. 47, No. 4, Jul. 2003, pp. 429-444.
Langstedt, N., "Linux File Permissions—1.0," tuxfiles.org, Retrieved from http://www.tuxfiles.org/linuxhelp/filepermissions.html, Oct. 5, 2005, pp. 1-4.
Lee et al., "Energy-Aware Memory Allocation in Heterogeneous Non-Volatile Memory Systems," ISLPED '03, Aug. 25-27, 2003, pp. 420-423.
Mathur et al., "Capsule: An Energy Optimized Object Storage System for Memory-Constrained Sensor Devices," SenSys '06, Nov. 1-3, 2006, pp. 195-208.
Narayanan et al., "Write Off-Loading: Practical Power Management for Enterprise Storage," ACM Transactions on Storage, vol. 4, No. 3, Nov. 2008.
Nath et al., "Online Maintenance of Very Large Random Samples on Flash Storage," PVLDB '08, Aug. 23-28, 2008, pp. 970-983.
Pease et al., "The Linear Tape File System," IEEE 26th Symposium on Mass Storage Systems and Technologies (MSST), May 3-7, 2010, pp. 1-8.
Piernas et al., "DualFS: a new journaling file system without meta-data duplication," Proceedings of the 16th international conference on Supercomputing, ICS 2002, Jun. 22-26, 2002, pp. 137-146.
Wikipedia, "XML," Wikipedia, http://en.wikipedia.org/wiki/XML version as of Mar. 19, 2009, pp. 1-20.
Zadok et al., "On Incremental File System Development," ACM Transactions on Storage, vol. 2, No. 2. May 2006, pp. 161-196.
Zhang et al., "BitVault: a Highly Reliable Distributed Data Retention Platform," Microsoft Research Asia, 2006, pp. 27-36.
Zhang et al., "HPTFS: High Performance Tape File System," 14th NASA Goddard—23rd IEEE Conference on Mass Storage Systems and Technologies, 2006, pp. 1-11.
Non-Final Office Action from U.S. Appl. No. 12/732,158, dated Jul. 23, 2015.
Final Office Action from U.S. Appl. No. 12/732,158, dated Feb. 12, 2016.
Notice of Allowance from U.S. Appl. No. 12/732,158, dated May 25, 2016.
Non-Final Office Action from U.S. Appl. No. 15/232,683, dated Jan. 11, 2019.

(56) References Cited

OTHER PUBLICATIONS

Final Office Action from U.S. Appl. No. 15/232,683, dated Jun. 17, 2019.

* cited by examiner

FILE INDEX, METADATA STORAGE, AND FILE SYSTEM MANAGEMENT FOR MAGNETIC TAPE

BACKGROUND

The present invention relates to tape-based data storage, and more particularly, to storing data and an index in different partitions on a magnetic recording tape.

Data storage drives, such as data tape drives, record information to and read information from media, such as the data tape of a tape cartridge. Data storage drives are often used in conjunction with, for example, a data storage and retrieval system. One example of such a system is an automated data storage library with robotic picking devices, wherein removable media cartridges are selectively transported between storage cells and data storage drives in an automated environment. Herein, automated data storage library, data storage library, tape library system, data storage and retrieval system, and library may all be used interchangeably.

A digital storage tape may contain multiple files. Files and data stored on tape are written to the tape sequentially, in a linear fashion. Unlike hard drives or solid state nonvolatile storage such as nonvolatile memory (NVM), tape does not allow direct-access write of data. In general, tape data can only be written linearly, in append-only mode. For example, the Linear Tape-Open (LTO) standard uses shingling to write tracks to increase tracks density. However, due to shingling, the in-place rewrite of a file or a data block stored in one track would destroy what has been written in the neighboring track.

File management of data on tapes has traditionally been different from that of direct-access storage media. In the latter, file system data structures are commonly used, keeping information such as a hierarchical directory structure, file names, file attributes (e.g. size, access information, access rights permissions), and a list of the physical storage blocks containing the file contents, etc. However, since such file system structures must be updated with information when any changes are made to files stored on the media, such file system structures are not well-suited to tapes, which do not allow rewrite of the file system information. While tape-based file system implementations do exist, reading the file system information requires positioning the tape to the end of the recorded data, and any update requires rewriting of a new copy of the entire set of file system structures at the end of the tape data.

One common approach to managing data on tape requires a storage system to manage the tape while storing a separate index of the tape content on an unrelated disk device or other remote direct-access storage media. For example, tape is no longer self-describing. Data stored on the tape cannot be accessed because the tape file index is left in the storage system's database, once the tape is taken out of the scope of the storage system, The longevity of the data is limited by the longevity of the storage system, including all its software, databases and hardware it is running on. Hence, while the tape media may preserve the bits intact for years, there is no guarantee that the files will survive as long since data on tape may no longer be interpretable and restored as files.

Another approach to storing files on tapes is via utilities such as TAR (Tape ARchive). The TAR program combines a set of source files into a single data set which is written to tape. The TAR file may include a header, which describes the TAR file contents and retains file metadata, and the body of the TAR file which may include the source files concatenated together. The TAR program makes the tapes self describing which avoids the dependency on an external index. However, TAR files are not appendable once written. An appended tape, therefore, may include several TAR files. Indexing such a tape will require multiple seeks and reads. Also there is the risk of data loss if a TAR file header is corrupted or its format becomes obsolete. Since the source files are concatenated in the data area, the TAR file header is required to determine the source file boundaries.

BRIEF SUMMARY

According to one embodiment, a data storage system includes a tape drive configured to: write a plurality of files to a first partition of a magnetic recording tape; and write an index to a second partition of the magnetic recording tape, the index including information about locations of data of the plurality of files in the first partition of the magnetic recording tape. A longitudinal buffering band is present between the first and second partitions; and the longitudinal buffering band is configured to isolate writing in the first partition from overwriting neighboring tracks in the second partition. In addition, the longitudinal buffering band comprises an entirety of at least one full wrap of the magnetic recording tape.

In accordance with another embodiment, a magnetic recording tape includes: a plurality of files to written to a first partition of the magnetic recording tape using a tape drive; and an index written to a second partition of the magnetic recording tape using the tape drive, the index including information about locations of data of the plurality of files in the first partition of the magnetic recording tape. A longitudinal buffering band is present between the first and second partitions; and the longitudinal buffering band is configured to isolate writing in the first partition from overwriting neighboring tracks in the second partition. In addition, the longitudinal buffering band comprises an entirety of at least one full wrap of the magnetic recording tape.

Any of these embodiments may be implemented in a magnetic data storage system such as a data storage and retrieval system, which may include one or more drives.

Other aspects and advantages of the present invention will become apparent from the following detailed description, which, when taken in conjunction with the drawings, illustrate by way of example the principles of the invention.

BRIEF DESCRIPTION OF THE SEVERAL VIEW OF THE DRAWINGS

DETAILED DESCRIPTION

Figure 1:
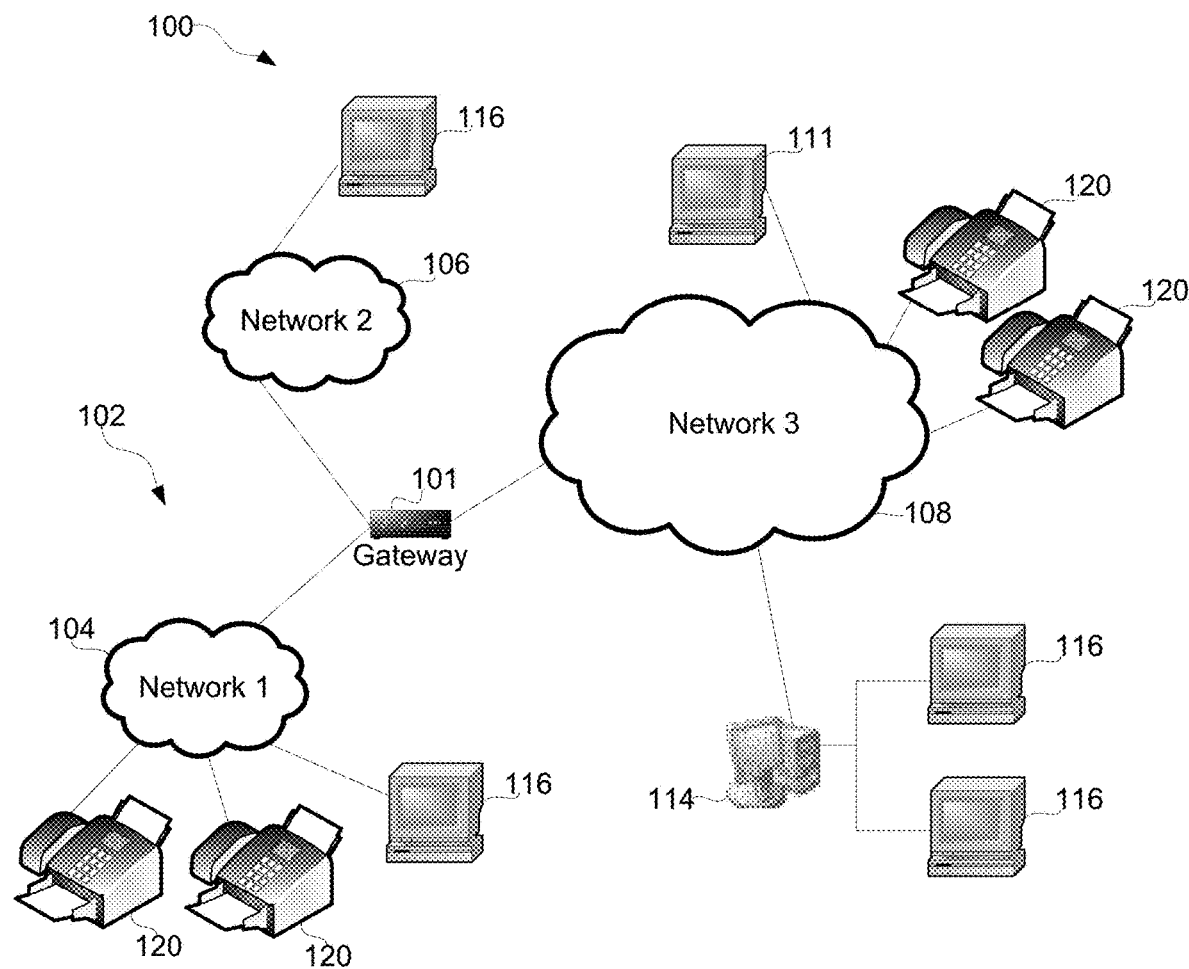
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses methods and systems to create, store, and maintain file system information on a tape cartridge, preferably utilizing a secondary partition on the tape to store and maintain the file system information.

In one general embodiment, a method for writing data to a magnetic recording tape comprises writing a plurality of files to a first partition of a magnetic recording tape using a tape drive and writing an index to a second partition of the magnetic recording tape using the tape drive, the index including information about locations of data of the plurality of files in the first partition of the magnetic recording tape. Preferably, the partitions are physically separate and independently addressable on the magnetic recording tape.

In another general embodiment, a method comprises storing file content in a first data partition of a magnetic recording tape using a tape drive, storing an index in a second data partition of the magnetic recording tape using the tape drive, and retrieving a desired portion of file content stored in the first data partition by providing direct access to arbitrary locations of the file content using the indexing information. The index comprises file content indexing information. Optionally, if the file content stored in the first data partition is updated by appending data to the file content, the index stored in the second data partition is updated by writing an updated version of the index.

In another general embodiment, a computer program product for writing data to a magnetic recording tape comprises a computer readable storage medium having computer readable program code embodied therewith. The computer readable program code comprises computer readable program code configured to write a plurality of files to a first partition of a magnetic recording tape using a tape drive, and to write an index to a second partition of the magnetic recording tape using the tape drive. The index includes information about locations of data of the plurality of files in the first partition of the magnetic recording tape.

In yet another general embodiment, a system for storing and maintaining data on a magnetic recording tape, and further storing an index of the data on the tape, comprises a data tape cartridge. The data tape cartridge comprises a magnetic recording tape having at least two independently writable partitions and an index to be recorded in a second partition. The two independently writable partitions allow a plurality of files to be recorded in a first partition, and the index contains references to the plurality of files in the first partition.

In one embodiment, a method, includes storing file content in a first data partition of a magnetic recording tape using a tape drive; storing an index in a second data partition of the magnetic recording tape using the tape drive, the index comprising file content indexing information; and updating the file content stored in the first data partition by appending new content to the file content and updating the index stored in the second data partition by writing an updated version of the index.

In another embodiment, a system for storing and maintaining data on a magnetic recording tape, and further storing an index of the data on the tape, comprises a data tape cartridge. The data tape cartridge comprises a magnetic recording tape having at least two independently writable partitions and an index to be recorded in a second partition. The two independently writable partitions allow a plurality of files to be recorded in a first partition, and the index contains references to the plurality of files in the first partition.

In a further embodiment, a method for formatting a tape includes formatting a first partition and a second partition on a tape using a tape drive; and writing an initial index to the second partition.

A dual-partition tape cartridge according to one embodiment includes a magnetic recording tape having a first partition and a second partition; and an initial index written to the second partition, wherein the partitions are physically separate and independently addressable on the tape.

A method for reading data from a magnetic recording tape having at least two partitions according to another general embodiment includes reading an index stored on a first partition of a magnetic recording tape using a tape drive; finding locations of a plurality of file portions on the magnetic recording tape using the index; and reading the file portions from a second partition of the magnetic tape using the tape drive.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked storage units, etc. may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

Figure 2:
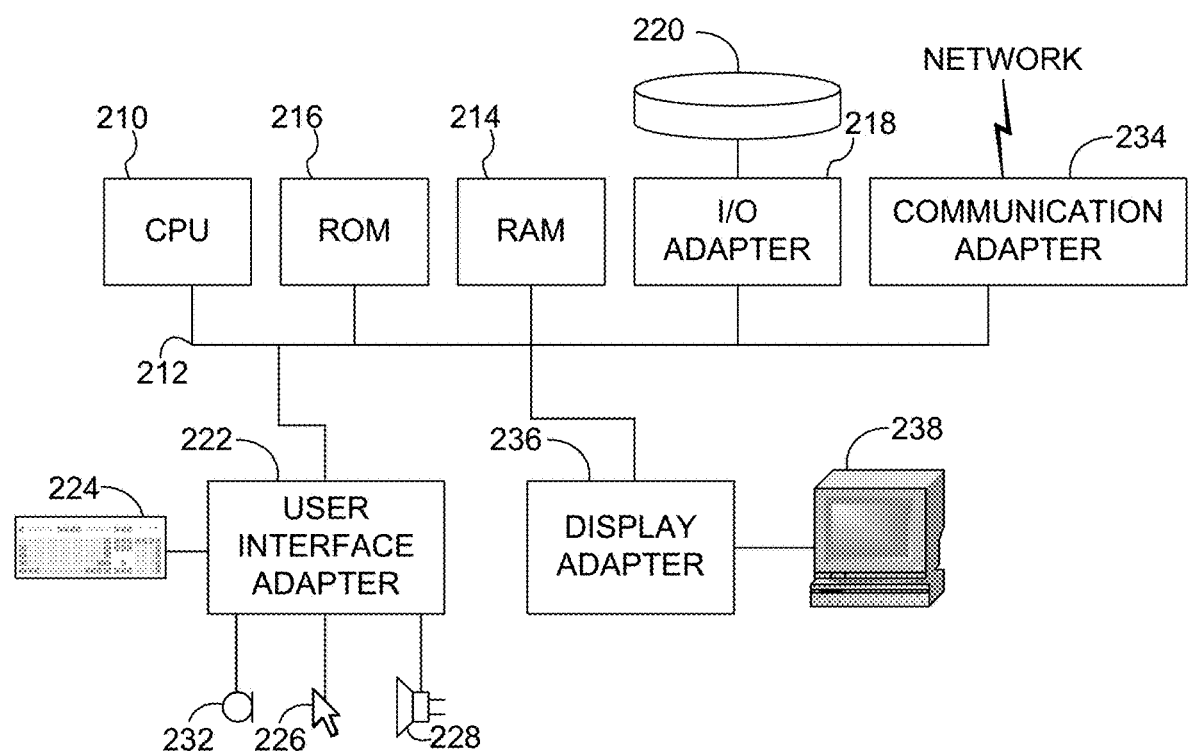
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
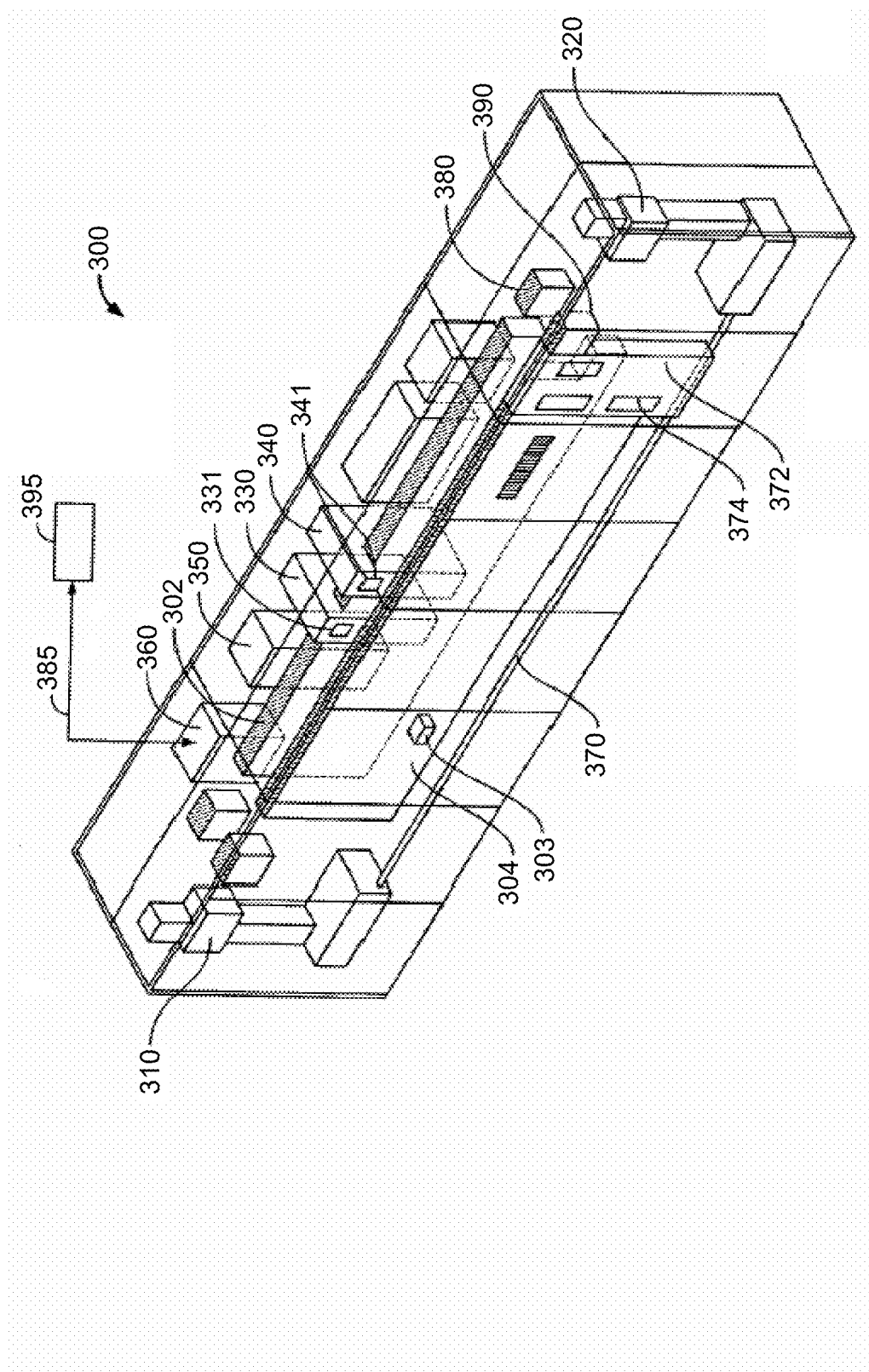
FIG. 3 is an isometric view of one embodiment of a data storage and retrieval system constructed in accordance with the present invention.
Figure 5:
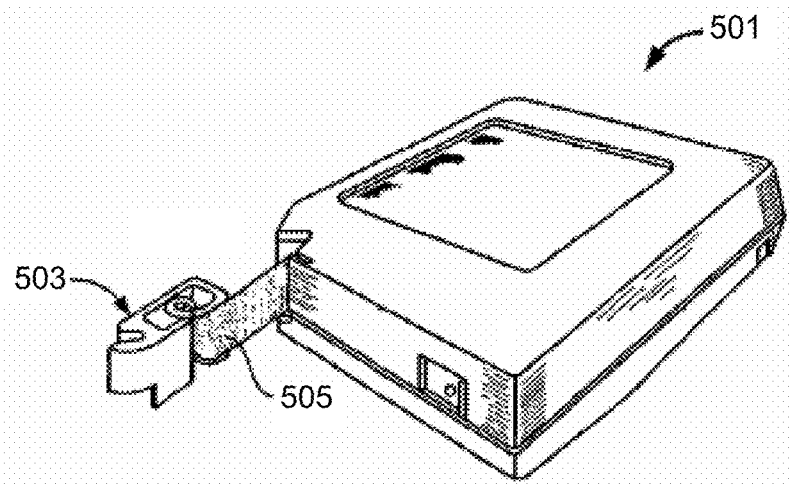
FIG. 5 is an isometric view of a removable tape cartridge used in conjunction with the tape drive of FIG. 4.

Referring to FIG. 3, a data storage and retrieval system 300 is shown. In the embodiment illustrated, data storage and retrieval system 300 is depicted as a robotic library. The upper interface of controller 360 allows data storage and retrieval system 300 to communicate with one or more hosts 395 via link 385. Link 385 may comprise an Ethernet, Infiniband, TCP/IP, Fibre Channel-Arbitrated Loop, SCSI, ESCON, FICON, or the like, depending on the application. The lower interface of controller 360 communicates with a plurality of drives that are positioned in drive enclosures 330 and 340. Drive enclosures 330 and 340 receive removable media cartridges 303 (e.g., see cartridges in FIGS. 5, 6, and 7), via robotic pickers 310 and 320. The removable media cartridges 303 may include or contain magnetic tape, optical tape, optical disk media, magneto-optical disk, CD, DVD, phase-change media, floppy disk, removable hard disk, electronic media, and the like. Robotic pickers 310 and 320 travel along rail 370 to move removable media cartridges 303 from inner storage wall 302 and outer storage wall 304 to drive enclosures 330 and 340 for the purposes of reading and/or writing data. Robotic pickers 310 and 320 also return the removable media cartridges 303 to storage walls 302 and 304.

An import/export station 372 includes access door 374 attached to the side of data storage and retrieval system 300. Access door 374 is preferably pivotally attached to the side of data storage and retrieval system 300; however, access door 374 could be slidably or otherwise attached. An operator panel or access station 350 permits a user to communicate directly with data storage and retrieval system 300. The operator access station 350 typically contains an LCD display, a keyboard or touch screen for user input, and circuits to monitor and control the I/O station doors.

First power component 380 and second power component 390 each comprise one or more power supplies that supply power to pickers 310 and 320, controller 360, operator access station 350, and drive enclosures 330 and 340 of data storage and retrieval system 300. Typically, at least one of the power components 380 and 390 provides direct current (DC) power, since most computer peripheral devices use DC power. One of the power components 380 and 390 may provide alternating current (AC) power as well. Controller 360 is in communication with power components 380 and 390, pickers 310 and 320, operator access station 350, drive enclosures 330 and 340, and data storage drives (see FIGS. 4, 12, 13) of data storage and retrieval system 300.

Figure 4:
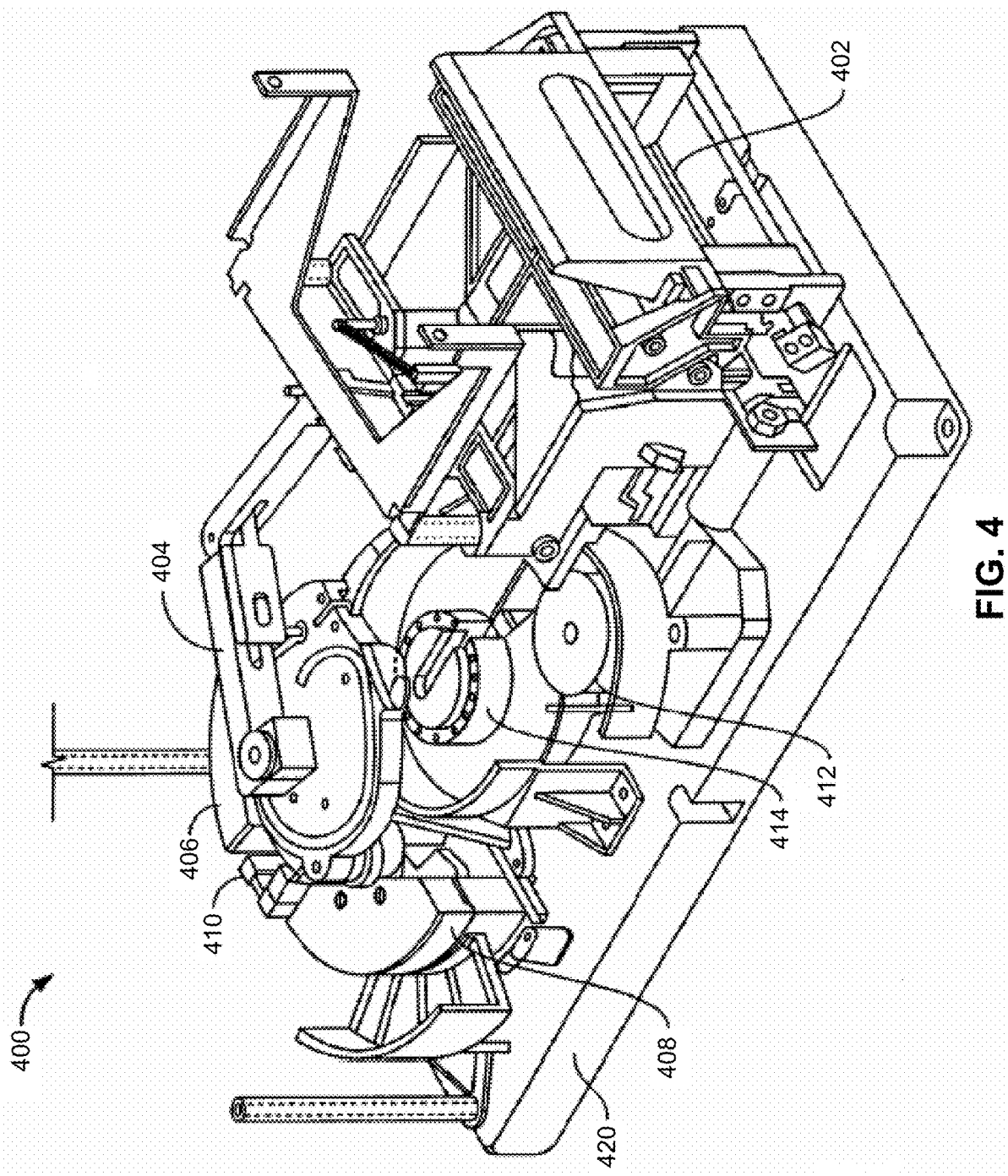
FIG. 4 is an isometric view of a tape drive utilized by the data storage and retrieval system of FIG. 3.

Referring now to FIG. 4, a typical reel-to-reel tape drive 400 is shown. As described above, any removable media data storage drive may be used, such as tape drives, optical and magnetic disk drives, electronic media drives, or any other drives and media as is known to those skilled in the art. A plurality of drives 400 are usually located inside of the library 300 of FIG. 3. Tape drive 400 may be any one of, for example, a family of tape drives using a single-reel tape cartridge, such as the IBM 3480, IBM 3490, IBM 3590, IBM 3592, Digital Linear Tape (DLT), and Linear Tape Open (LTO) tape drives. Cartridge loader 402 receives a single-reel tape cartridge 501 (FIG. 5) and threader 404 (FIG. 4) threads the leader-block 503 (FIG. 5) of the tape 505 around the tape guides 406 (FIG. 4) and 408, and around the tape tension transducer 412, and into the take-up reel 414. Tape guides 406 and 408 support the tape as the tape moves over the magnetic tape head 410. All of these components are supported by base plate 420. One or more tape drives 400 are located inside drive enclosures 330, 340 (FIG. 3) in order to protect the tape drives 400 (FIG. 4) from dust and debris, as well as extraneous air currents that could disturb the way the magnetic tape 505 (FIG. 5) passes over the magnetic head 410 (FIG. 4).

Figure 8:
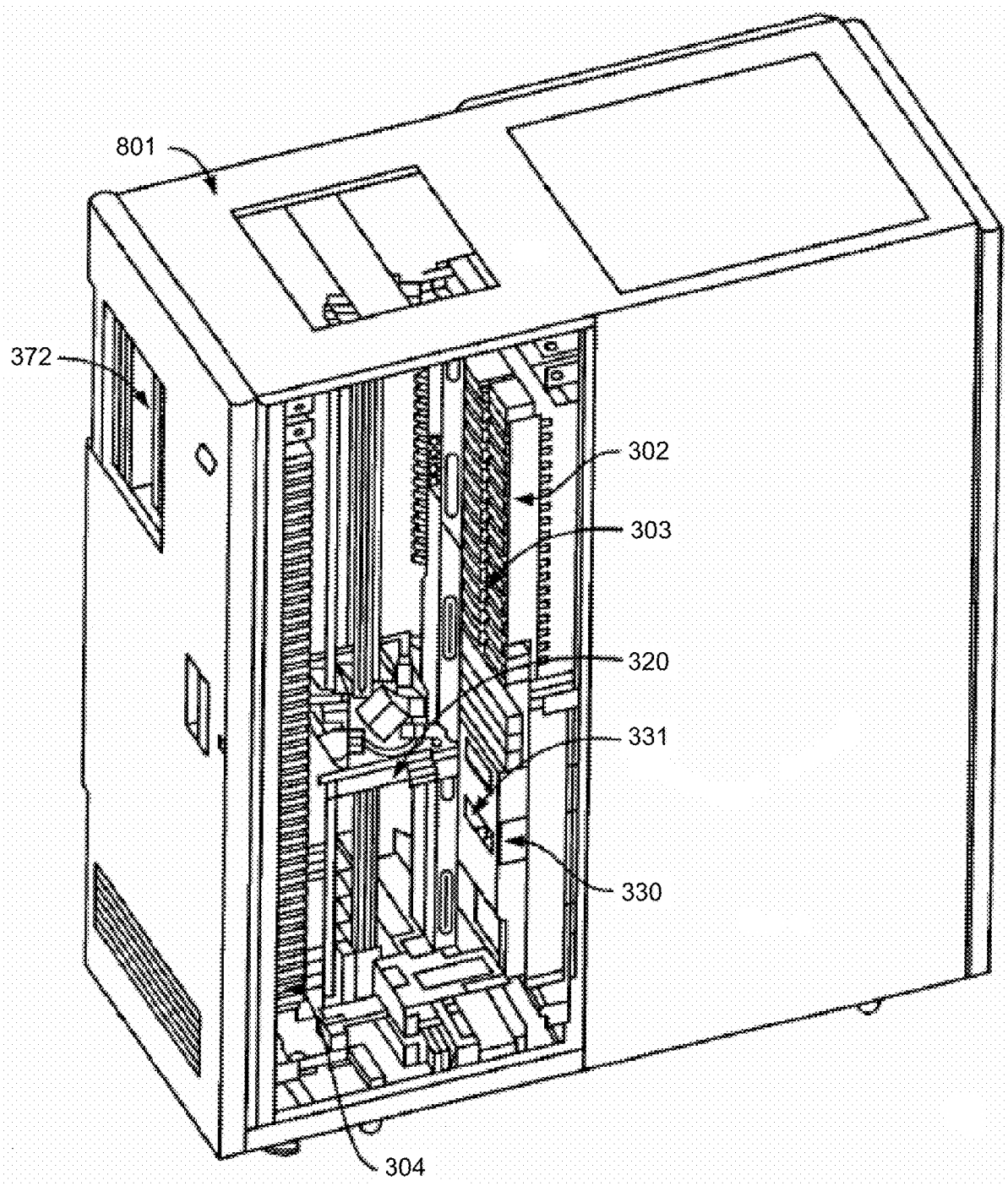
FIG. 8 is an isometric view of a storage module utilized by the data storage and retrieval system of FIG. 3.

The data storage and retrieval system 300 of FIG. 3 is typically assembled from a series of frames or storage modules 301, such as the L-frame type storage module illustrated in FIG. 8. A storage module is an expansion component of the library. Frames, accessors, magazines, etc. may comprise examples of storage modules. The storage module may comprise one or more of the following: one or more storage shelves for holding data storage media, one or more data storage drives for reading and/or writing data on the data storage media, one or more import/export stations for operator access to the data storage media, one or more accessors for moving the data storage media to/from data storage drives and storage shelves, one or more frames or compartments for holding additional storage modules or library components. In the example of FIG. 3, with reference to FIG. 8, the desired number of storage modules 801 are assembled into data storage and retrieval system 300. Storage module 801 comprises a picker 320, a drive enclosure 330, an inner storage wall 302, and an outer storage wall 304. A plurality of removable storage media 303 are located in each storage wall 302, 304. In this example, removable storage media 303 comprises tape cartridges, but may also comprise other types of media such as those described above.

Figure 10:
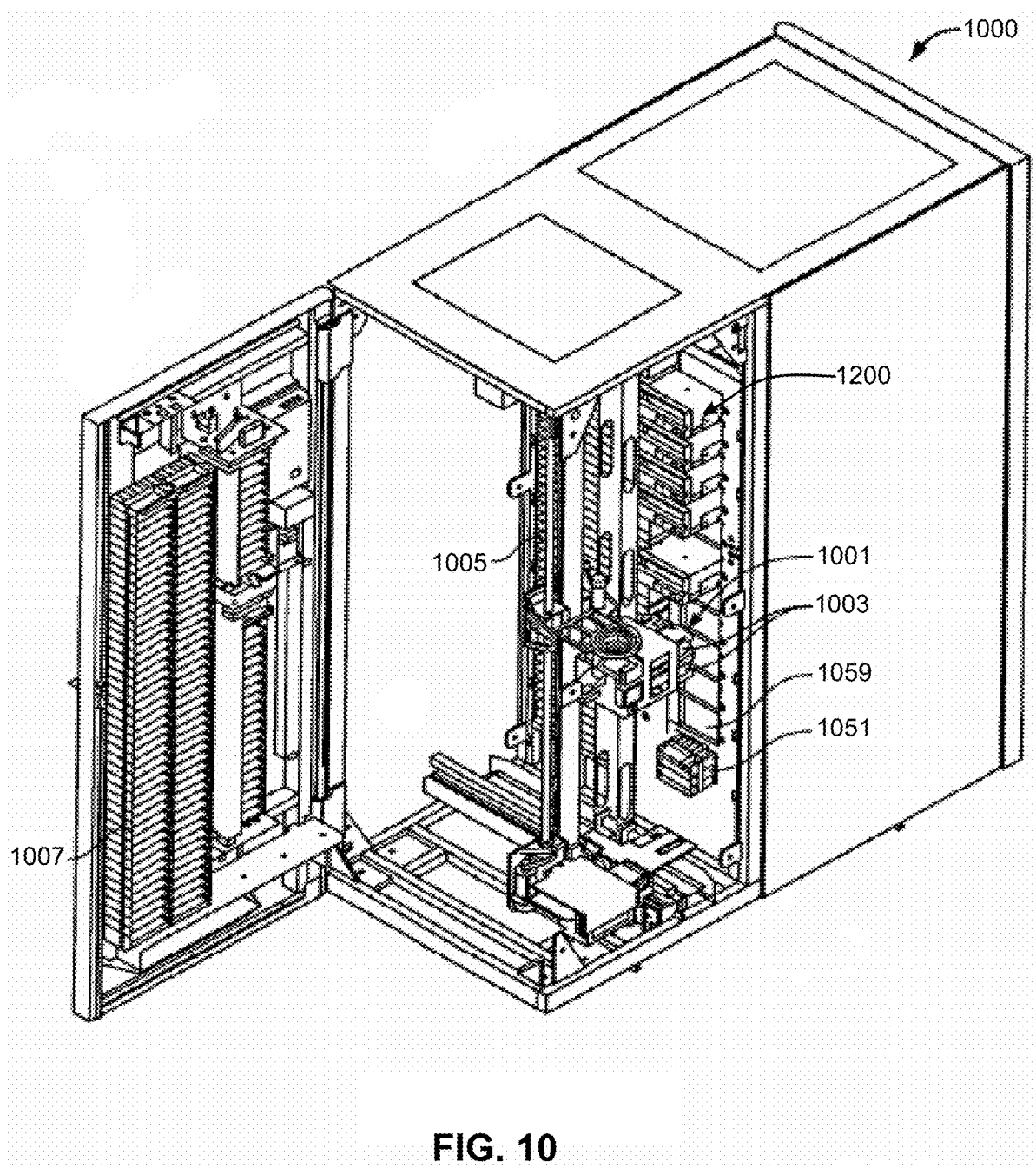
FIG. 10 is an isometric view of an alternate configuration of the storage module of FIG. 8 with a front door open and a rear door closed.
Figure 11:
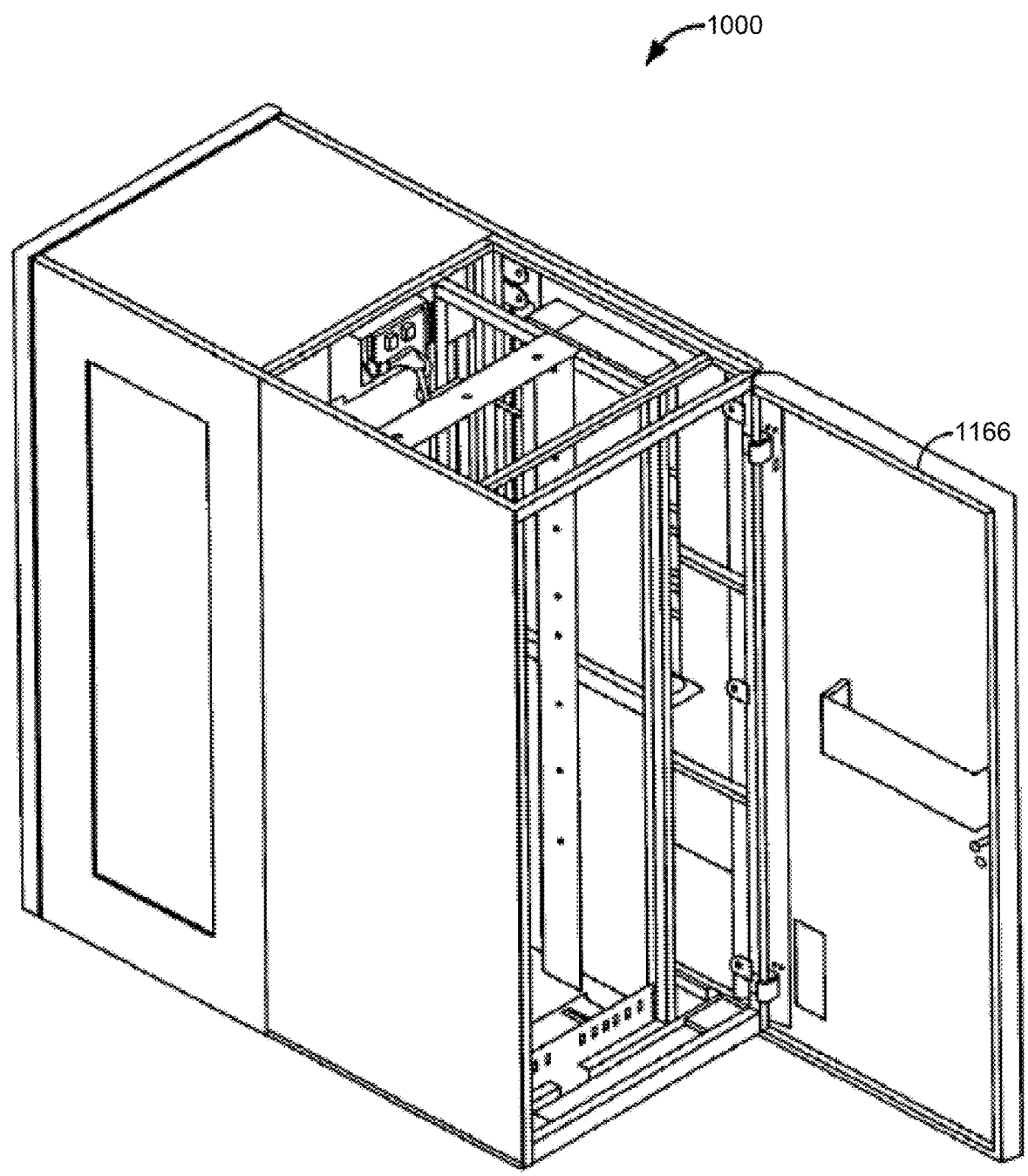
FIG. 11 is a reverse isometric view of the storage module of FIG. 10 with the front door closed and the rear door open.
Figure 12:
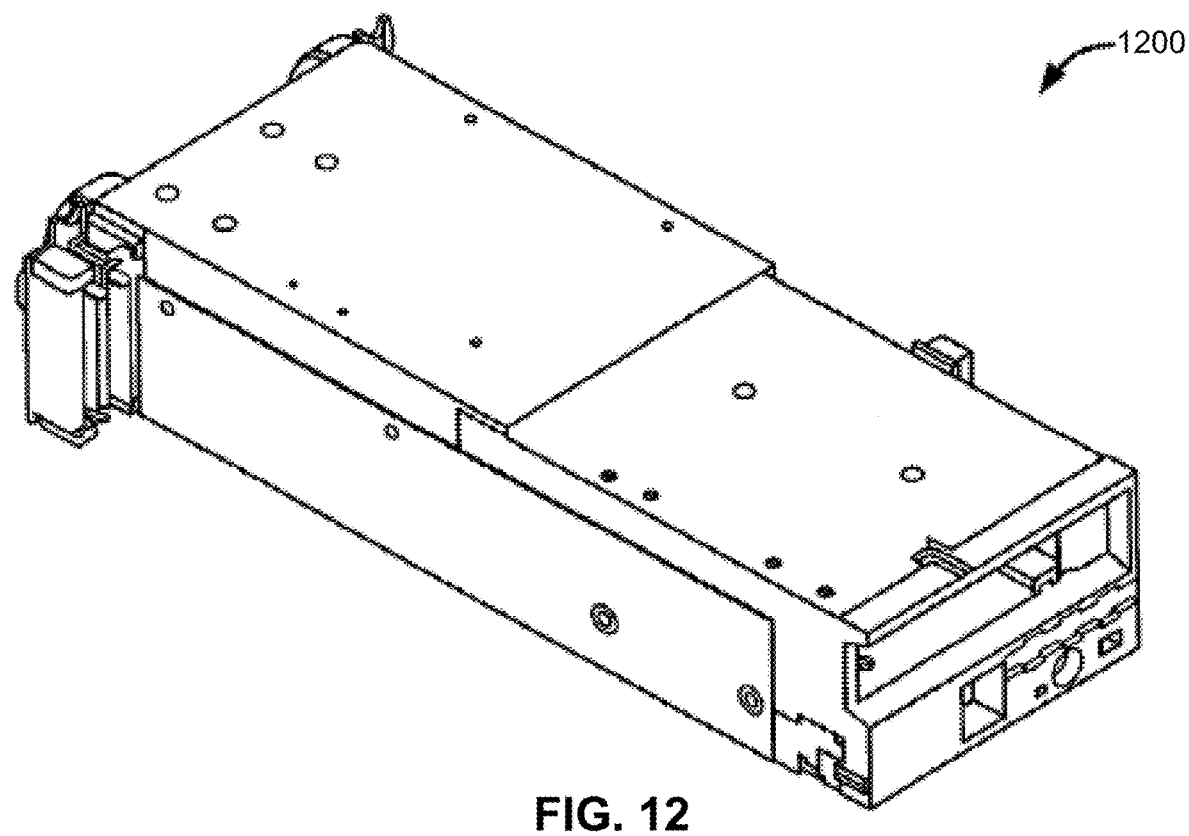
FIG. 12 is a front isometric view of a drive canister.
Figure 13:
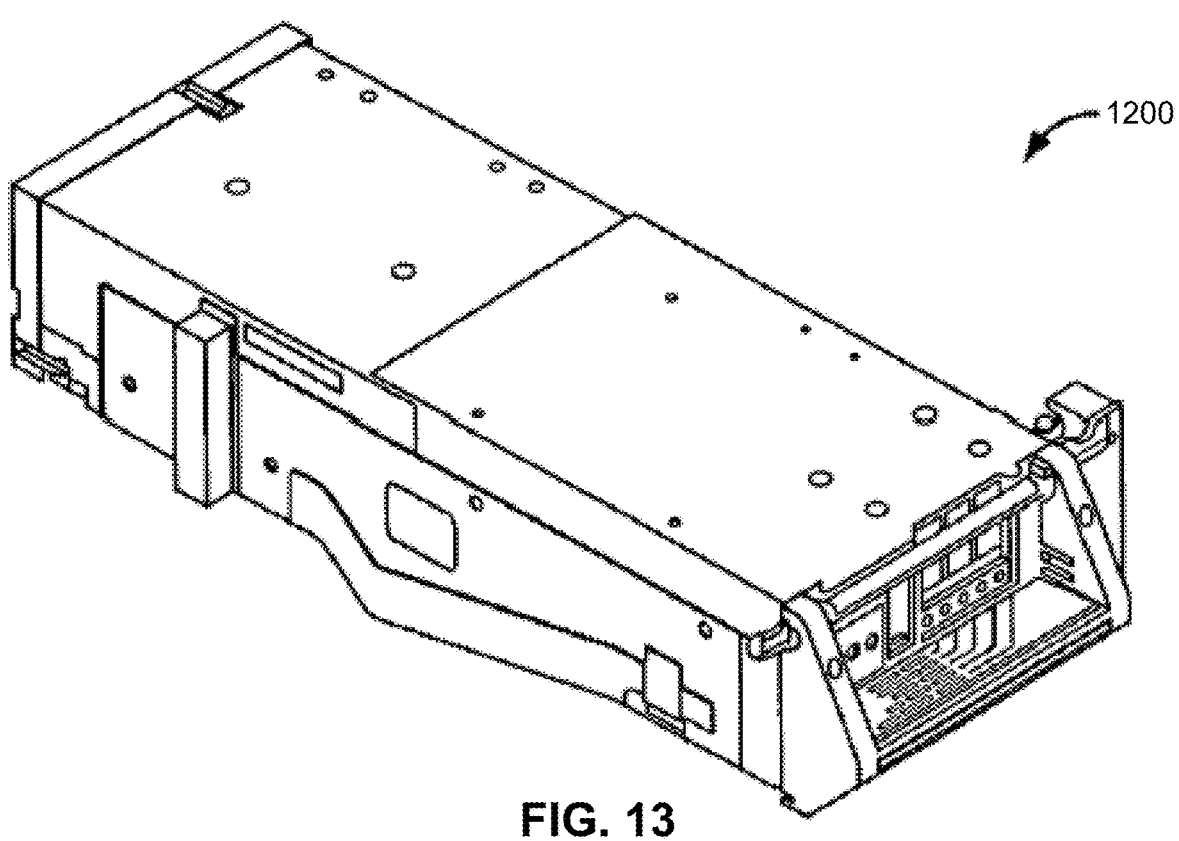
FIG. 13 is a rear isometric view of the drive canister of FIG. 12.

Removable storage media 303 are inserted via robotic pickers 310, 320 into drive enclosures 330, 340 via entrances 331, 341, respectively, where removable storage media 303 are mounted inside the data storage drive, such as tape drive 400 (FIG. 4) or data storage drive 1200 (FIGS. 4, 12 and 13). Each picker 310, 320 (FIG. 3) includes a gripper assembly having a bar code scanner for reading cartridge labels, or other means for identifying the cartridges. As best shown in FIG. 10, a gripper assembly 1001 may contain, for example, a plurality of grippers 1003. The grippers 1003 are mounted in a cage that can pivot from one side of the library to the other. This allows access to both storage walls 1005, 1007 by either gripper.

Figure 6:
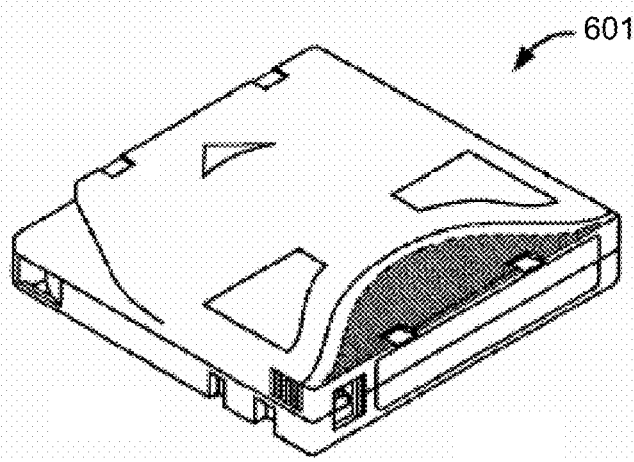
FIG. 6 is an isometric view of an alternate removable tape cartridge usable in conjunction with a tape drive.
Figure 7:
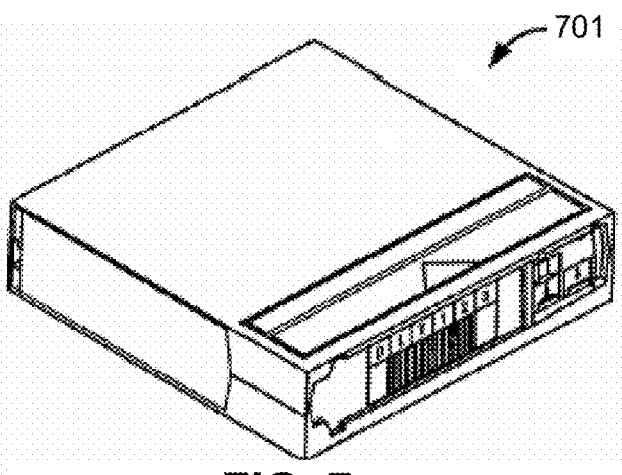
FIG. 7 is an isometric view of another alternate removable tape cartridge usable in conjunction with a tape drive.
Figure 9:
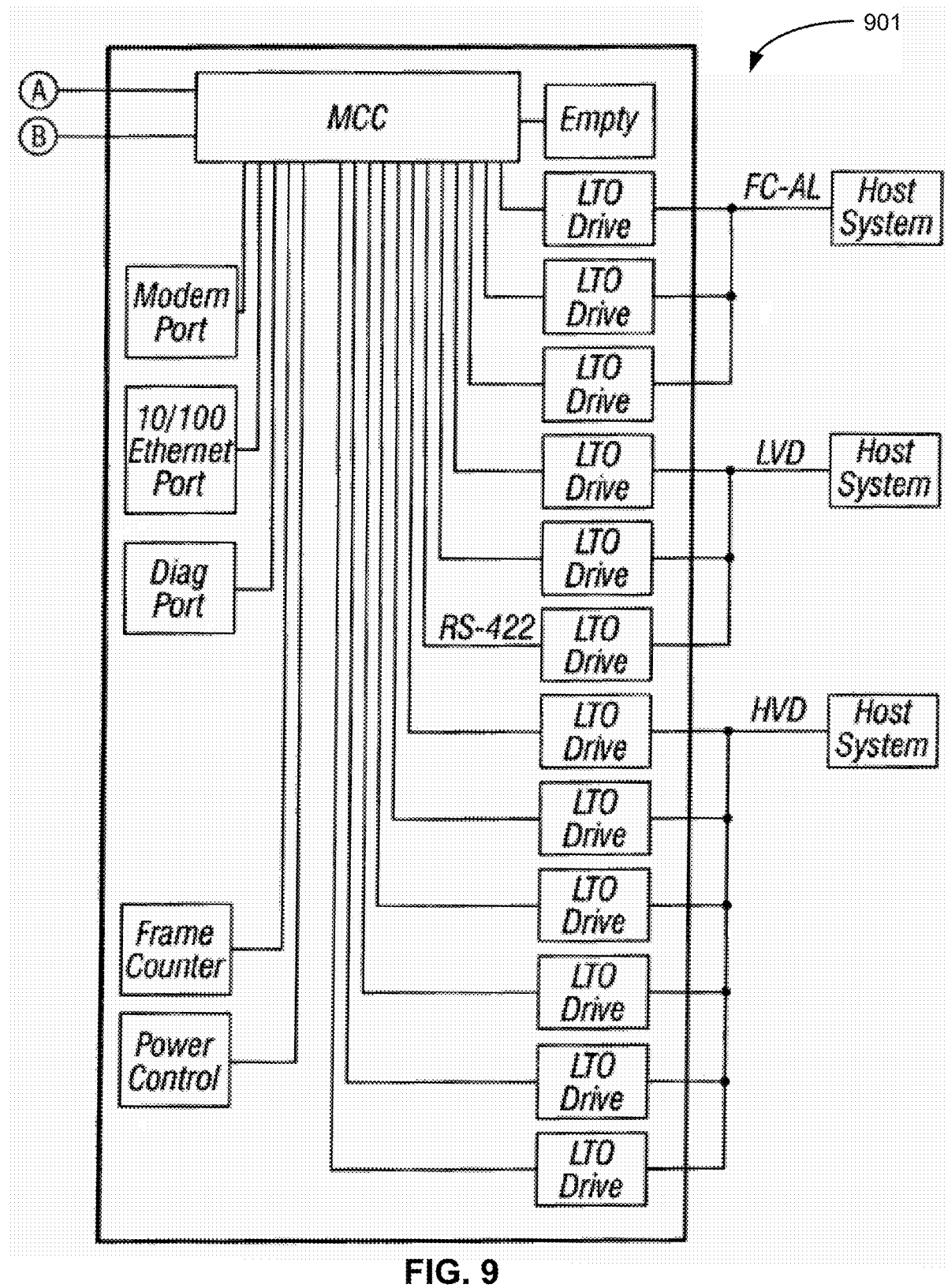
FIG. 9 is a schematic diagram of an alternate storage module utilized by the data storage and retrieval system of FIG. 3.

Referring now to FIG. 9, a schematic diagram of an optional frame or storage module known as a Linear Tape Open (LTO) D-frame 901 is shown. LTO D-frame 901 provides additional storage and may provide additional drives as well. The description is similar to that for storage module 801, except that there may be zero to twelve tape drives for LTO tape cartridges 601 (FIG. 6). FIG. 7 shows another alternate removable tape cartridge 701 usable in conjunction with a tape drive. If no drives are installed, then no MCC and supporting circuits/ports will be installed.

To increase the storage capacity of data storage and retrieval system 300 (FIG. 3), one or more cartridge storage devices 1051 (FIG. 10) may be present to store media cartridges. As used herein, a cartridge storage device is a device capable of holding several media cartridges (defined above) for transportation, storage, and/or use in conjunction with a data storage and retrieval system 300 (FIG. 3). The cartridge storage device may be capable of storing a number of media cartridges, optionally with each cartridge stored on a transport mechanism that feeds the cartridge to the front of the cartridge storage device for access by the library picker 310, 320.

It must also be noted that the teachings herein can be applied to a standalone storage system, such as a tape drive connected to a host system, e.g., via a SCSI or USB interface. Such storage system may function in a conventional manner and provide further functionality according to the teachings presented herein.

According to one aspect of the invention, a second partition may be used on a tape to keep an index of the files in the main data partition and/or partitions. For simplicity, the descriptions included herein are of a dual-partition tape, where one partition is used for storing the index, denoted as the index partition, and the other partition is used to store the files content, or data, and hence is referred to as the data partition. Of course, in implementation, more than two partitions may be used on a tape to store indices and/or files, and the invention is not limited by the descriptions of dual-partition tape included herein. In one preferred embodiment, the data partition is larger than the index partition.

In one embodiment, a method for writing data to a magnetic recording tape includes writing a plurality of files to a first partition of a magnetic tape using a tape drive and writing an index to a second partition of the magnetic recording tape using the tape drive, the index including information about locations of data of the plurality of files in the first partition of the magnetic recording tape. The partitions are physically separate and independently addressable on the magnetic recording tape. Note that the method may be performed on a server and/or host, with the writing steps including sending instructions to the tape drive to physically write the data. Alternatively, or in conjunction with any of the above, one or more writing steps may include sending instructions to a tape drive to physically write data. Moreover, the writing steps may be performed by the drive itself.

Tape partitioning may be performed and implemented in various ways. For example, a tape may be partitioned into two segments, the first one associated with one partition and the second one associated with the second partition. In one approach, each partition spans over the entire width of the tape and may contain the maximum number of tracks and wraps allowed by the tape drive and media. Another way to partition a tape is a longitudinal partition, where one or more wraps are designated to one partition and the rest form the second partition. Sometimes, such as with the case of shingling writing on tape, a buffering band of wraps has to be left between the first partition and the second partition to isolate writing in one partition from overwriting neighboring tracks in the second partition. The characteristics of a partitioned tape, namely separate addressing on each partition and independent writing and rewriting of the partition are relevant to various embodiments of this invention. However some embodiments may utilize tapes with two or more partitions, independent of the particular partitioning implementation.

In one approach, a method for formatting a tape includes formatting a first partition and a second partition on a tape using a tape drive, and writing an initial index to the second partition. A plurality of copies of the initial index may be created and stored in one of the partitions, e.g., the second partition. Moreover, a plurality of label blocks may be created at the beginning of one or more of the partitions.

Figure 15:
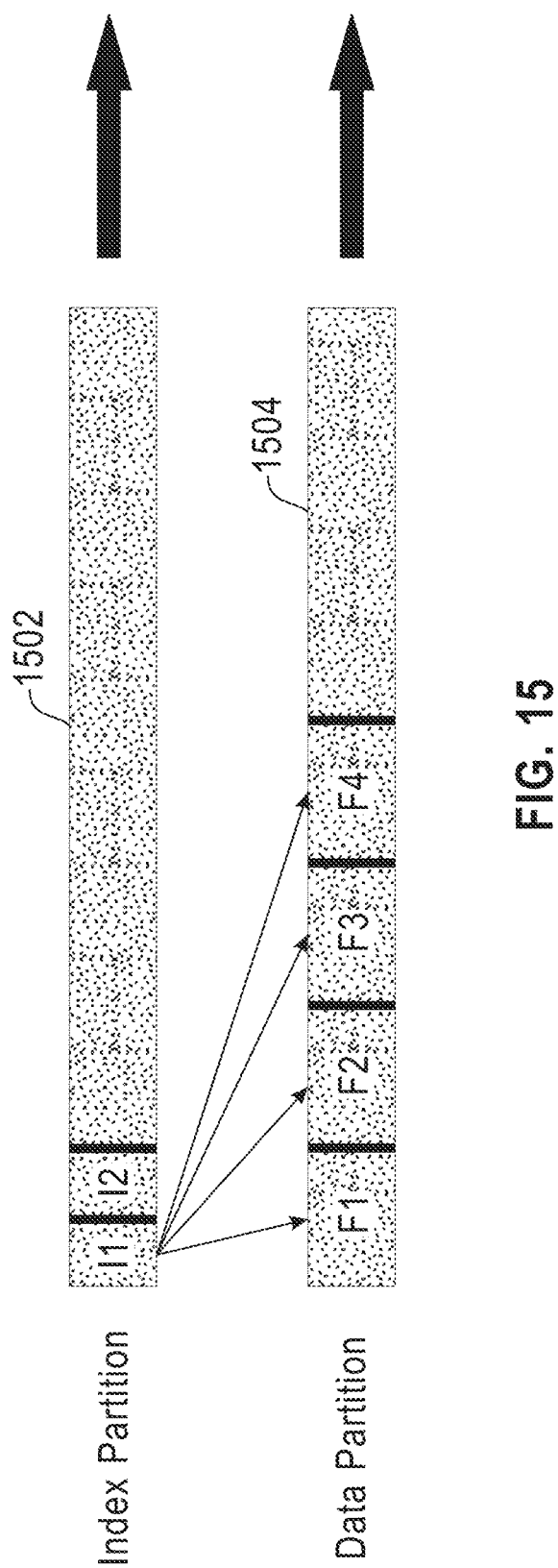
FIG. 15 shows a dual partition tape with index partition and data partition.
Figure 16:
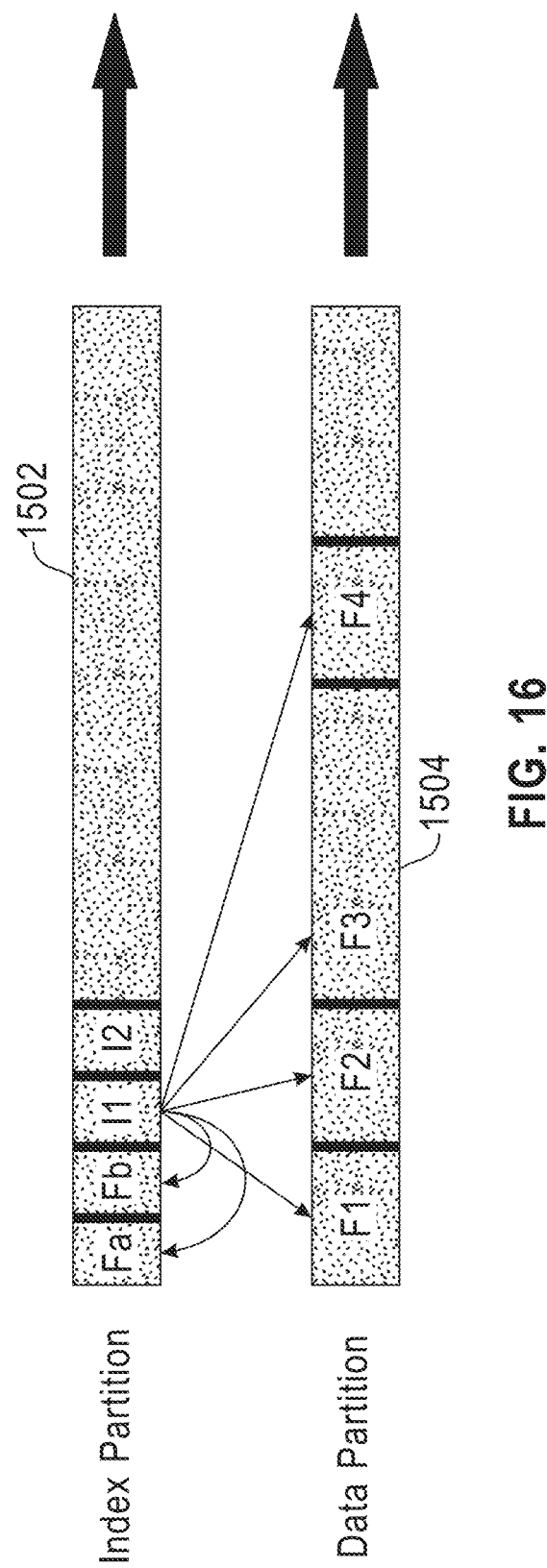
FIG. 16 shows the dual partition tape with two metadata files stored on the index partition.
Figure 17:
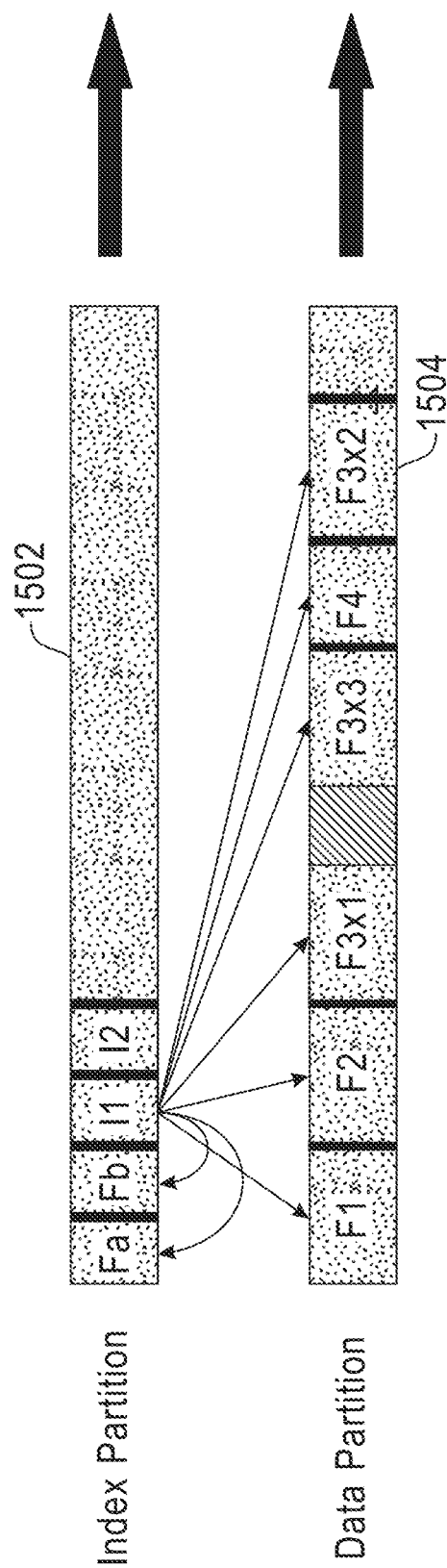
FIG. 17 shows the tape of FIG. 16 after modifying file F3 using multiple extents.

FIGS. 15, 16 and 17 illustrate the utilization of a dual-partition tape for efficient storage and update of a file system index on tape. The partitions 1502, 1504 are drawn side by side for illustration purposes, but may be in line, created on separate wraps, etc. FIG. 15 depict a tape with two partitions 1502, 1504, where one partition is denoted as the Index Partition 1502 and the other partition is denoted as the Data Partition 1504. Further, the illustration shows four segments on the data partitions, each correspond to one file. The files are named F1, F2, F3 and F4. The index partition 1502 contains an index of the files and directories on tape. The index points to the locations of the files on the Data Partition 1504. When files are added to the data partition 1504, the index I1 can be overwritten and updated with a new index, now containing the additional files as well. In this illustration, an optional, second copy I2 of the index is present. In such a case, both copies can be rewritten and updated together, keeping two essentially identical copies for redundancy and robustness purposes. In another embodiment, the two copies of the index are not equal. They may contain the last two versions of the index, before and after the last changes were made to the tape. When new changes are made, copy I1 of the index is overwritten with the content of I2, and I2 is overwritten with the new index, containing the last changes. This allows the system to roll back the changes, as is later explained in more detail. Of course, more copies of the index can be kept, both for redundancy and for preserving previous versions of the index for roll back operations.

FIG. 16 illustrates the tape from FIG. 15, further storing two more files Fa, Fb on the index partition 1502. While storing files on the index partition may result in increased time to access the index at the time a tape is loaded into the drive and mounted by the files system, there are certain cases and applications, and certain types of files, for which such a case is desired and efficient. In one embodiment, these files are relatively small and contain metadata about much larger files stored on the data partition. Such metadata may support applications to find content within the large files without need to read these large files in entirety. In other embodiments, metadata about data files may be updated frequently and efficiently on the index partition and without filling up the tape with multiple obsolete copies of the metadata files in previous versions by rewriting the index partition in whole, removing the old versions and replacing them with new ones. During this operation, the data resides on the data partition remains intact.

FIG. 17 further shows modification of file F3 on the tape of FIG. 16. As is described later, the index and file system allow the system to efficiently modify files on tape by replacing old parts of files with new ones and updating the extents list for the file in the index.

According to some embodiments, the information about the plurality of files may include additional file system attributes of the plurality of files. It is possible to keep rich metadata about the data files in an index on the index partition. Such metadata could include standard file attributes such as the file name, file size, file type, date of creation, date of last modification and other dates, access permission information, checksum of the file content, owner, and more. The file metadata may include an mode number or a sequential number or a file ID. The index may further contain an encryption key, used to encrypt the file data.

The index may further contain directory entries. The directories may be presented in a hierarchical structure. A directory entry in the index may include the directory name, user access permissions such as for listing, erase and modification, dates, and other directory properties and extended attributes. A directory may contain other directories, files and links. A link entry may reference (link) to another file or directory.

The index partition may further contain metadata files, previews, and/or search indices. These files may be updated when new data is added to the data partition. Further, at least some of the attributes may be settable by a user.

Multiple other indices may be stored, in addition to the files and directories index, according to some approaches. One example is a search index, where the content of data files may be analyzed and indexed prior to when or after they were written to tape, and a search index file may be created. The search index file can then be stored on the index partition, allowing quick access at tape load time and further allowing deletion and replacement with an updated search index when new files are added to the data partition.

In one embodiment, a plurality of small metadata files are stored on the index partition. These metadata files may describe data files stored on the data partition. They may capture a small portion of the index partition. At tape mount time, the files index and some or all the metadata files stored on the index partition can be quickly and efficiently read and saved or cached in a secondary storage system such as a computer or drive memory, hard disk drive, etc. and made available for fast access without need to seek the tape again to read them.

According to some approaches, the method may include generating and storing a search index in the second data partition by analyzing and indexing the content stored in the first data partition. The search index allows access when loading the magnetic recording tape, and the search index may be updated when data is appended to the file content stored on the first data partition, in some embodiments. The index may be updated by a write function that overwrites some or all of the index, writes an extension to the index, etc.

In some embodiments, the method may further comprise writing a plurality of files to a third partition of a magnetic recording tape using a tape drive, and writing an index to the second partition of the magnetic recording tape using the tape drive, the index including information about locations of data of the plurality of files in the first and third partitions. In addition, more than three partitions may be included, with information about locations of data of the plurality of files in all of the partitions other than the second partition written in the index on the second partition.

According to some aspects of the present invention, files may be appended to a data partition and the index may be updated on the index partition by rewriting it. Also, according to some more aspects of the present invention, a hierarchical directory and structure of references to the plurality of files may be maintained, where files are listed under directories. In addition, files may be deleted from the index without rewriting the data partition. A reference may be a file name, folder, etc.

It is understood that while the logical representation of directories and files may show files associated by listing them sequentially in the same directory, the files may be stored on the tape in two independent locations, not in proximity to each other. Furthermore, files may be moved between directories in the index while their data stays in their original location on tape.

Metadata files stored on the index partition may also show in the index of the tape and the directories. They may be listed in the directory the same way other files on the data partition are listed. For example, a directory may include several large media files stored on the data partition and several small metadata files, containing information about the media files, stored on the index partition. Some logic may be applied to files when written to tape to decide on which partition to write each file.

In one embodiment, a large video file is stored using the Material Exchange Format (MXF). A metadata only (MOE) file contains an index of the video frames and their byte-offset location in the video file. Both files are listed in the same logical directory, however the video file is stored on the data partition and the MOE file is stored on the index partition. The MOE file is automatically read by the file system at time of tape mount and is cached in memory. To access the video and read only a segment in the middle of it, from frame i to frame j, an application first read the MOE file—which is already cached by the file system in memory and is readily available. Using the MOE file, the application determines the byte offset corresponding to frame i and the byte offset corresponding to frame j. Then the application can access and read this video segment directly, without reading the rest of the video file.

In some approaches, the method may include outputting the hierarchical directory structure for display. The directory structure may be in the form of a tree, list, etc., for display purposes.

Of course, the index may be stored in many forms and formats. In one embodiment, the index of the data partition files and directories (the index) in the second data partition may be stored as an XML file with a plurality of name-value pairs. An example XML schema for an index file is shown below:

```
<?xml version="1.0" encoding="ISO-8859-1"?>
<volumeserial>xxxxxx</volumeserial>
<index>
    <schemaversion>n.nn</schemaversion>
    <blocksize>nnM</blocksize>
    <updatetime>yyyymmddhhmmssmmm</updatetime>
    [dir_entry...]
    [file_entry...]
</index>
<dir>
    <name>dirname</name>
    [<modifytime> yyyymmddhhmmssmmm</modifytime>]
    [dir_entry...]
    [file_entry...]
</dir>
<file>
    <name>filename</name>
    <length>nnnnn</length>
    [<readonly>{no|yes}<readonly>]
    <modifytime>yyyymmddhhmmssmmm</modifytime>
    [<creationtime>yyyymmddhhmmssmmm</creationtime>]
    [<accesstime>yyyymmddhhmmssmmm</accesstime>]
    <extentinfo>
        extent_entry, including partition
    information...
    </extentinfo>
    [<extendedattributes>
        xattr_entry, including partition
    information...
    </extendedattributes>]
</file>
```

```
<extent>
    <partition>n</partition>
    <startblock>nnnn</startblock>
    <blockcount>nnnn</blockcount>
</extent>
<xattr>
    <key>keyname</key>
    <value>attrvalue</value>
</xattr>
```

The schema includes such properties of the index as the last time of update and the cartridge serial number, according to some approaches. It may include directories, for which the directory properties are stored. A directory may contain other directories and files. A file may have general properties, such as name and date of creation. It also may have an extent list, which is essentially a description of the file location on tape. Each extent may be composed of the partition number, the start block, and the number of blocks occupied by the file at that extent. A file may span one or more extents, in one or more partitions, etc. Using multiple extents, according to some approaches, a portion of the file may be updated while keeping the unchanged parts intact, on one or more tapes.

Each extent may contain one or more sequential blocks. The extent information may contain the block number of the first block in the extent and the number of blocks in the extent. In one embodiment, all blocks in an extent except perhaps the first and last blocks are of equal size. A tape drive may be able to address and seek to a location on tape based on a block number. When block size information is kept in the index, the file index may efficiently support a seek operation, to access the file at any given byte offset. When a byte offset is provided within a seek command, the file system determines the block number in which this byte offset resides. It then issues a command to the tape drive to seek to the beginning of this block. Then, the file system may read the entire block and seek to the exact byte location within this block while being cached in memory. Hence keeping most blocks identical in size has benefit to simplify the calculation of the block number. When a file has multiple extents, the file system may first determine within which extent the byte address is and then it computes the block number within this extent.

This is illustrated in FIG. 16 and FIG. 17, which were discussed above. In one approach, FIG. 16 illustrates a tape with two partitions 1502, 1504, the index partition containing two metadata files and two copies of the index, the data file containing four files. Assume the file content F3 is to be updated. In one approach, the new content is appended at an end of the file content in the first data partition. The index is updated to reflect the updating by modifying an extents list of the file content by removing portions of extents deleted by the file modification and adding new extents to the extents list to reflect the location of the new content added by the updating thereby creating an extents list that accurately represents the file content after the updating modification. FIG. 17 shows the tape after file F3 has been modified where a portion in the middle of the file has effectively been replaced with new content. The modified file has three extents. The first extent marked F3x1 is the first portion of the original file, that was not modified. The second extent marked F3x2 is new content, written to the tape at the end of written data after file F4. The third extent F3x3 is the last portion of the original file that was not modified. By reading these three portions and concatenating them in the correct order, the modified file can be retrieved from the tape. The actual recorded portion on the tape between F3x1 and F3x3 may remain unmodified to allow roll-back to the previous version of the file F3, may be erased, etc.

Extended Attributes (EAs) allow storing additional information about files, as defined by a user's applications. This metadata may be automatically carried over with the file when it is copied by the file system to another storage space with a file system which is compatible with and supports EAs, such as ext2/Linux, XFS, and FAT-16, among others. The content of an EA can be stored in place inside the XML index file, or as a block of data with a reference from the XML index file. EA can be created, written and modified by an operating system, by a file system, by applications, services, agents, and other software programs. EA may include additional information about the file, its format and the way data is organized in the file, its content, its handling in a process or a workflow, expiration date, corporate policies, legal information such as copyrights and license, index terms for file and content-based search, and so on.

It is understood that while the present disclosure describes an XML files index, the files index may be stored in many other formats and representations, such as a database file, a binary file, and so on. One advantage of storing it in XML format is that the index is easily readable and can be read from tape, parsed and used by many different applications on many operating systems. Another advantage is the format flexibility to store various information and metadata about files without breaking or ever changing the file format. One disadvantage of XML files is their relatively large size compared to a more compact binary representation. However in many scenarios index accessibility for many years ahead is the most important consideration, well addressed by an XML files index.

In some approaches, a version of the index as it existed prior to the updating thereof may be stored in the second partition. Further, the method may include accessing the index as it existed prior to the updating thereof for retrieving one of the files or portion thereof that is not present in the updated index. This allows access to older versions of files that are no longer indexed in the updated index.

A further advantage of some embodiments of this invention is rapid access to the index as it is stored in its own partition, as opposed to other methods which may store the index along with the data, thus taking more time to seek to the index location, usually at the end of written data and access it.

In some approaches, a redundant copy of the index may be stored in the first partition and/or the second partition. In even more approaches, the redundant copy of the index may be written when the first copy of the index is written, or it may be written after the first index is written.

In some cases, a new index file is appended to the index partition after every change made to files on tape or after every mount of the tape or after every access session to the tape. All the old index files are stored on the index partition and are not overwritten. The last index file written on the tape describes the present content of the tape. The old index files represent past versions of the tape content, before consequent changes has been made. They may further provide information for tracking back all the previous versions of content on tape, as well as access information, logged in the index files, such as last access time and date, user name and machine ID, in previous sessions.

A further advantage of some embodiments of the present invention is the support of file update on tape. In such a case, the old version of the file, or portions thereof, become obsolete and a new version of the file or the corresponding portions may be appended to the data partition. The index may also be updated to reflect these changes.

In more approaches, the method may include retrieving a desired portion of file content stored in the first data partition by providing direct access to arbitrary locations of the file content using the indexing information. This is advantageous over prior art methods and apparatuses in that it allows efficient direct access to arbitrary locations within a file, and the retrieval of only the desired portion of a large file rather than the whole file, which reduces the retrieval time and increases the performance as compared to the prior art.

In some embodiments, the method further includes rolling back a last update of the file content in the first data partition and changes to the index in the second data partition if the storing of the file content or index was interrupted prior to completion.

This approach is advantageous over prior art methods and apparatuses in that it includes a rollback function, which allows rolling back to the last set of data updates and returning to the tape image as was before those updates, thus increasing the ability to withstand and recover from power outages and other interruptions while writing and supporting a Cancel Write operation in the middle of updating the tape.

In some preferred embodiments, the index may be associated with an operating system level file system implementation to allow a file to appear in a computer user's name space in a format indistinguishable from a disk file. The operating system level file system may hide the difference between accessing disk and tape data to allow an application written for disk to be used to transparently access file content stored on the first data partition of the dual-partition tape cartridge.

There are some distinctions between the simple use of an index stored on the tape and some embodiments of the present invention. Two of these distinctions may be: (1) Due to the fact that the on-tape index is tied to an OS-level file system implementation, the files appear in the computer user's name space in a form indistinguishable from disk files; and (2) the file system hides the difference between accessing disk and tape data, and allows applications written for disk to be used to transparently access data on tape. Both of these attributes are significant advances over simply having an on-tape index.

Legacy operating systems like MVS/zOS allow accessing tape data through the file system (access methods). However, the information about which files are on the tape is kept in a disk-based index (catalog). In these systems, there is header information on the tape for each file; however, the entire tape is scanned to find the header information. According to some embodiments, there are differences from this model in that the index is on the tape itself; thus, the information about which files are located on the tape (along with other file metadata) is available as soon as the tape is mounted; and additionally, unlike the MVS approach, the on-tape index, in some embodiments, allows tapes to move from one system to another without losing any information about the data files on the tape.

The situation is similar for storage management and tape storage systems like Tivoli Storage Manager (TSM). While the files on TSM tapes have some self-describing header information, the tapes have no index and the TSM system relies on an on-disk catalog to find data on the tapes. Some embodiments differ from a file system on disk primarily due to the differences in physical capabilities between disks and tape. Three differences are the immensely longer seek times for tape, the fact that tape data cannot be reliably overwritten in place (but only appended), and the significantly smaller number of overwrites that tape media can sustain before it becomes unusable. The combination of these hardware differences makes a tape file system implementation fundamentally different from one designed for a disk. Specific differences in the implementations include the need to store directory and file information in a single, quickly-accessible location on the tape (as opposed to distributed throughout the disk as is typically done with disk-based file systems), much less frequent updates to metadata on tape due to both the slow seek times and the limited overwrite capabilities of tape, and the requirement of appending all new or updated data to the end of the media. The last of those differences motivates another fundamental difference between disk and tape file systems, the fact that a tape is essentially a single-user medium, and that when writing data a tape file system can only allow a single file at a time to be accessed.

Hard drives can also be partitioned into multiple partitions. In the case of a hard drive, each partition may be formatted, mounted, utilized and managed independently of the others. The file index of each partition is kept on the partition itself. However, according to some embodiments, designating one partition of a tape as an index partition has numerous benefits and advantages. Moreover, the two partitions complement each other and serve as a single coherent volume. They may be jointly formatted, accessed, and managed, in a way that requires careful synchronization of actions to ensure consistency between the two (that is, between the data files and their index).

An example of a workflow describing the major file operations performed by the file system to manage the tape data and index on a dual partition tape is included below according to one embodiment:

Format
1. Load a tape.
2. If tape is not partitioned, create two partitions.
3. For each tape partition, if partition contains any content, erase the content.
4. Create an initial index on one partition, denoted as index partition.

Load (Mount)
1. Load the tape into a tape drive.
2. Access the index partition.
3. Skip to end of the written part of this partition, backspace to last file, check for XML tape index.
4. If no XML, offer to format (initialize tape) or to eject tape or to ignore tape (release tape control to other applications).
5. Read XML and build in-memory data structures used to describe tape content (directories and files) and to access data.
6. Mount the tape as a name space under the file system Load (Mount) with Caching of any Files Stored on Index Partition
1. Load the tape into a tape drive.
2. Access the index partition.
3. Read the content of the index partition to end of written data, cache content in memory.
4. Access last cached file, check for XML tape index.
4. If no XML, offer to format (initialize tape) or to eject tape or to ignore tape (release tape control to other applications).
5. Read XML and build in-memory data structures used to describe tape content (directories and files) and to access data.

6. Associate and link cached blocks of data with the corresponding file extent entries in the in-memory data structure.
7. Mount the tape as a name space under the file system.

Open File
1. Access the built in-memory data structures to access/create file just as for disk file system.
2. Mark in in-memory data structure that file is open.

Read File
1. Get partition and block information from in-memory structures.
2. Position tape to appropriate block.
3. Read tape and return data to application.

Write (New File)
1. Select partition to write to.
2. Position tape to end of current data on selected partition.
3. Query tape position.
4. Write data to tape.
5. Record position and length of data in in-memory structures.
6. Repeat steps 3 and 4 for subsequent sequential writes.

Write (Append to File)
1. If overwriting part of existing last data block:
  a. Read last data block.
  b. Adjust in-memory extent information to exclude last block.
2. Position and write data as when writing a new file.
3. Add extent information for new extent of file to in-memory structures.

Find seek location (position to a byte offset in a file)
1. Use the extents list of the file, stored in the in-memory data structure to compute the extent containing the seek point.
2. Subtract the byte offset of the beginning of the extent from the seek point to find byte offset within the extent.
3. Use the extent's list of blocks to find the block containing the seek point.
4. Compute byte offset within the block corresponding to seek point.

Write (Modify an Existing File)
1. If overwriting part of existing (but not last) data block:
  a. Adjust in-memory extent information to exclude current version of the block.
2. Position and write data as when writing a new file.
3. Write new version of the modified block.
4. Add new extent information for extent of new block/s to in-memory structures, in place of excluded block.

Close File
1. Insure all data in buffers is flushed to tape.
2. Write EOF tape mark.
3. Optionally sync (depends on user option).

Delete File
1. If file is open return an error code.
2. Remove the file entry form the in-memory data structure.

Rename File
1. If file is open return an error code.
2. Modify the file name in the in-memory data structure.

Move File (to Another Directory on the Same Tape)
1. If file is open return an error code.
2. Modify the in-memory data structure to place the file node under the new folder location.

Synchronization
1. Write any buffered data to tape.
2. Rewrite index file (if any changes were made).

Eject (Unmount)
1. Unmount the file system name space.
2. Write end of data (end of tape) tape mark on the data partition/s, if changed.
3. Write updated XML directory information from in-memory structures to the index partition.
4. Write end of data (end of tape) tape mark on the index partition, if changed.
5. Physically eject tape.

Figure 14:
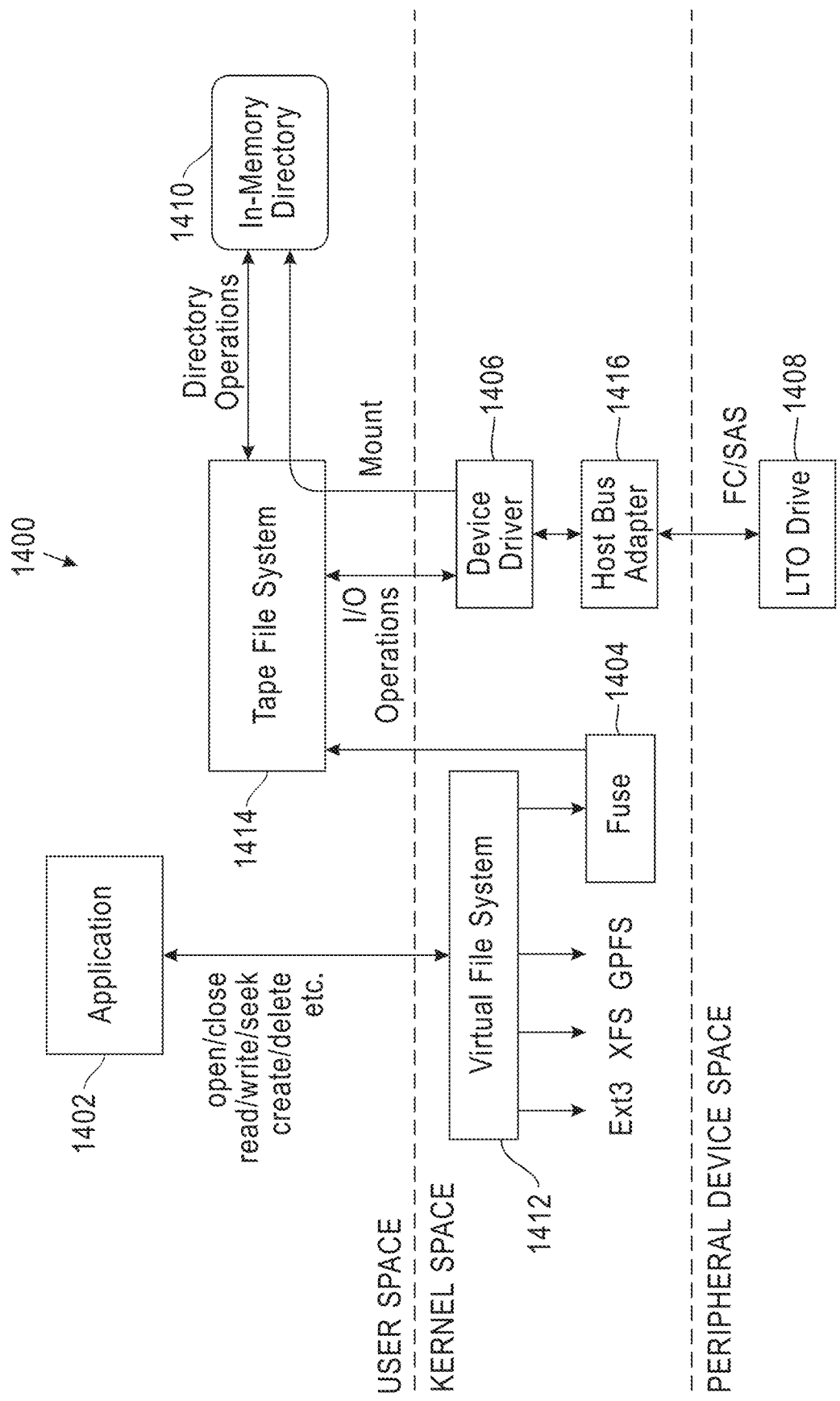
FIG. 14 shows a flowchart of the implementation of a file system on tape using FUSE according to one embodiment.

In one embodiment, the file system may be implemented using FUSE on a Linux operating system. An example of a workflow chart 1400 of how this might be implemented, according to one approach, is shown in FIG. 14. In FIG. 14, an Application 1402 can perform operations such as opening, closing, reading, writing, seeking, etc., The application communicates with the Virtual File System (VFS) 1412 through standard file access interfaces. These operations occur in the User Space. In the Kernel Space, VFS Layer 1412 transfers the operation request to FUSE. The FUSE loadable kernel module 1404 directs any file access requests to the tape file system module in user space. The FUSE FS 1404 can perform directory operations with an In-Memory Directory 1410. Device Driver 1406 may be accessed by the tape file system module 1414 for I/O Operations and to Mount, Unmount, and/or Synchronize with the In-Memory Directory 1410 through the FUSE FS 1404. The Device Driver may then communicate with a tape drive (LTO) 1408 through a Host Bust Adapter 1416 for recording and/or writing of data to a tape. As can be seen, the application accesses files on tape via standard file I/O calls the same way In addition, deleting a file can be achieved by deleting its entry from the index. The file location on the tape cannot be reclaimed unless the tape is rewritten. Also, index updates are not necessarily committed to tape at the close of every file. They may be committed before an eject is performed.

A file data may be stored encrypted with the key saved in the index file. Each block may be encrypted separately. When a file is deleted, the encryption key is erased. Hence, while the encrypted file data is still on the tape, the data cannot be open and the file data may be considered as it was purged from the tape. This operation is made possible by having an index file which can be overwritten (and the encryption key erased), a clear advantage of this invention, according to some embodiments.

The methods and apparatuses described herein are not limited to a specific index file format. Further, the index may be composed of multiple files. In addition, richer metadata associated with data files, such as image thumbnails, video proxies, storyboards, video trailers, MXF, MPEG-7, Quicktime headers, MPEG-4 headers and/or other information for multimedia files, DICOM metadata for medical data objects, thumbnails and/or OCR text for scanned forms and documents, may be stored on the index partition. These files are made available for fast access when tape is loaded, and are allowed to be modified as data files are, or even in place (by rewriting the entire index partition).

The content of the index partition can be read after tape is loaded into the drive and cached in memory, on a hard drive or on a non-volatile memory. The cache allows in-cache index update and metadata access, read, write and modifications. At the time of a Sync or Eject command, the changes in the cache may be committed to the tape.

In one preferred embodiment, the file system automatically decides if a file stored on the tape may be stored in the index partition or in the data partition. The selection can be made by rules, including but not limited to file size, file type, file name, and/or file extension. In such a case, a user may or may not have the means to set up the rules, but may have no control of where a file is stored once the rules are set. The rules may be stored in the index file and may be changed from time to time (without impacting what is already saved on the tape).

In another embodiment, each partition may be exposed to the user as a directory under the mount point of the tape. For example, /TapeDrive1/data1/, /TapeDrive1/data2/ and /TapeDrive1/index/ may correspond to two data partitions and one index partition, respectively. In such a case, the user may choose to which partition to write by placing the file under the corresponding directory. A special consideration may apply to the index partition, because filling it up may block updates to the index file and render the tape invalid. Hence, the file system my preserve a certain amount of space on the index partition, such as 1 GB, to ensure sufficient room to write the index file.

In a preferred embodiment, the index may be stored as an XML file. In one preferred embodiment, two, three, four (or more) copies of the index may be saved, e.g., one, two (or more) copies of the current index and one, two (or more) copies of the previous index, before last modifications were made. One reason for keeping multiple copies is to decrease the risk of losing the index due to a tape error. One reason to keep copies of the previous index is to allow a rollback of the last modification. According to the preferred implementation, data on the data partition may never be erased, only appended. While some blocks may become obsolete (e.g., after file deletion and removal of information from the index), the data remains intact. Hence, by replacing the current index file with the previous index file, and repositioning the end-of-file marker on the data partition and/or partitions accordingly, a complete rollback of the index and the data partition to its previous state can be accomplished. This is particularly useful in a dynamic workflow environment, where intermediate work can be committed to tape and then rolled back the next day, and overwritten with an updated version. Additional rollback to even an even earlier version of the tape could be made if copies of correspondingly earlier indexes are kept.

In one embodiment, the file index may be cached and saved on a hard drive or a solid state drive. A plurality of index files, corresponding to plurality of tape cartridges, may be stored and accessed at need. These index files may be made available for browsing when the tape cartridge is not loaded in the drive. For example, the file system described above may provide listing of directories, file names and file attributes while the tape is not loaded in the drive.

Further, a tape library may contain a plurality of cartridges and one or more drives. In one embodiment, the content of each cartridge is listed under a folder associated with the cartridge. At mount time, the file system may associate a name space with the library. allow search for files by file name, size and other such file attributes and Extended Attributes across the plurality of tape index files saved on a hard drive. When application requests to open a file, the system identifies the cartridge in which this file resides, issue a command to the library to load this tape into a drive, and then open the file as before. The system may further compare the index on tape with the copy of the index saved on the hard drive to make sure that the tape content has not been changed since the time the index copy was saved on the hard drive.

An illustrative method for how a file system opens a file on a tape cartridge in a library is as follows. A request to open file in a directory under the library mount point is received. The cartridge ID is determined from the folder path to the mount point. If the cartridge is not loaded in a drive, an available drive is identified (if none, wait for one to be freed or fail open), a Load command is issued to the library to load the tape cartridge to the drive, and the index on the index partition is accessed and an in-memory data structure is created. Next, the folder and file node location is found in the in-memory index, and the file is opened (as in the single-cartridge open operation).

A dual-partition self describing tape has multiple advantages when used in a library. Other tape storage systems keep the index information in a database or other files, risking a loss of access to data if the database is lost or has become unusable. When tapes are self-describing, the library index may be rebuilt at any time from the information stored on tapes alone. To rebuild the index, each tape has to be mounted and the index file need to be read, cached on hard drive and ingested into the database. Furthermore, metadata associated with the content on tape which resides on the index partition can also be efficiently read by the computer program and ingested into content management systems which manage data objects stored on the tapes. The ability to efficiently and accurately rebuild centralized library indices from individual tapes is another benefit of several embodiments of this invention.

According to some approaches, a computer program product for writing data to a magnetic recording tape may include some of the functionality described herein. For example, the computer program product may include a computer readable storage medium having computer readable program code embodied therewith. The computer readable program code may be configured: a) to write a plurality of files to a first partition of a magnetic recording tape using a tape drive, b) to write an index to a second partition of the magnetic recording tape using the tape drive. The index may include information about locations of data of the plurality of files in the first partition of the magnetic recording tape.

In more embodiments, a system for storing and maintaining data on a magnetic recording tape, and further storing an index of the data on the tape, may include a data tape cartridge. The data tape cartridge may include a magnetic recording tape having at least two independently writable partitions. The two independently writable partitions allow a plurality of files to be recorded in a first partition, and an index to be recorded in a second partition. The index contains references to the plurality of files in the first partition.

The system may further comprise a tape mounting unit for mounting the data tape cartridge as a storage volume, according to some approaches. The data tape cartridge may be usable by a computer program running on an attached computing system.

In some embodiments, the index may further comprise a plurality of user settable file attributes. In more approaches, the index may further contain a hierarchical directory and structure. The plurality of files may be stored on more than one partition, such as a third partition, fourth partition, etc. In addition, use of data on the data tape cartridge may be indistinguishable from use of data on disk.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Potential applications of the embodiments disclosed herein should not be limited to the data storage applications and systems presented herein by way of example, but may include many other types of tape-based storage and systems such as systems that use write once tapes, video players, video data transfer systems, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A data storage system, comprising a tape drive configured to:
   write a plurality of files to a first partition of a magnetic recording tape; and
   write an index to a second partition of the magnetic recording tape, the index including information about locations of data of the plurality of files in the first partition of the magnetic recording tape;
   wherein a longitudinal buffering band is present between the first and second partitions;
   wherein the longitudinal buffering band is configured to isolate writing in the first partition from overwriting neighboring tracks in the second partition; and
   wherein the longitudinal buffering band comprises an entirety of at least one full wrap of the magnetic recording tape.

2. The data storage system as recited in claim 1, comprising a copy of the index in the second partition stored in a nonvolatile memory coupled to a cartridge that houses the magnetic recording tape, wherein the copy of the index is an identical copy of the index.

3. The data storage system as recited in claim 1, wherein file content of the plurality of files is written in multiple linear tracks each having a longitudinal axis oriented parallel to a longitudinal axis of the magnetic recording tape.

4. The data storage system as recited in claim 3, the linear tracks being written in multiple wraps.

5. The data storage system as recited in claim 1, wherein the first partition is a longitudinal partition arranged longitudinally along the magnetic recording tape.

6. The data storage system as recited in claim 1, wherein the second partition is a longitudinal partition arranged longitudinally along the magnetic recording tape.

7. The data storage system as recited in claim 1, each partition comprising multiple wraps.

8. The data storage system as recited in claim 1, wherein the index in the second partition is aligned on the magnetic recording tape, in a direction perpendicular to a longitudinal axis of the magnetic recording tape, with at least one of the files in the first partition.

9. The data storage system as recited in claim 1, the longitudinal buffering band extending along shingled tracks of the first partition along a longitudinal axis of the magnetic recording tape.

10. The data storage system as recited in claim 1, wherein the tape drive is further configured to write one or more metadata files to the second partition;
    wherein the one or more metadata files include information about at least one of the plurality of files on the first partition; and
    wherein the one or more metadata files are positioned ahead of the index relative to a beginning of the second partition.

11. A magnetic recording tape, comprising:
    a plurality of files to written to a first partition of the magnetic recording tape using a tape drive; and
    an index written to a second partition of the magnetic recording tape using the tape drive, the index including information about locations of data of the plurality of files in the first partition of the magnetic recording tape
    wherein a longitudinal buffering band is present between the first and second partitions;
    wherein the longitudinal buffering band is configured to isolate writing in the first partition from overwriting neighboring tracks in the second partition; and
    wherein the longitudinal buffering band comprises an entirety of at least one full wrap of the magnetic recording tape.

12. The magnetic recording tape as recited in claim 11, comprising a copy of the index in the second partition stored in a nonvolatile memory coupled to a cartridge that houses the magnetic recording tape, wherein the copy of the index is an identical copy of the index.

13. The magnetic recording tape as recited in claim 11, wherein file content of the plurality of files is written in multiple linear tracks each having a longitudinal axis oriented parallel to a longitudinal axis of the magnetic recording tape.

14. The magnetic recording tape as recited in claim 13, the linear tracks being written in multiple wraps.

15. The magnetic recording tape as recited in claim 11, wherein the first partition is a longitudinal partition arranged longitudinally along the magnetic recording tape.

16. The magnetic recording tape as recited in claim 11, wherein the second partition is a longitudinal partition arranged longitudinally along the magnetic recording tape.

17. The magnetic recording tape as recited in claim 11, each partition comprising multiple wraps.

18. The magnetic recording tape as recited in claim 11, wherein the index in the second partition is aligned on the magnetic recording tape, in a direction perpendicular to a longitudinal axis of the magnetic recording tape, with at least one of the files in the first partition.

19. The magnetic recording tape as recited in claim 11, the longitudinal buffering band extending along shingled tracks of the first partition along a longitudinal axis of the magnetic recording tape.

20. The magnetic recording tape as recited in claim 11, comprising one or more metadata files written to the second partition;
    wherein the one or more metadata files include information about at least one of the plurality of files on the first partition; and
    wherein the one or more metadata files are positioned ahead of the index relative to a beginning of the second partition.

* * * * *